(12) United States Patent (10) Patent No.: US 11,718,025 B2
Kitamura et al. (45) Date of Patent: Aug. 8, 2023

(54) ADDITIVE MANUFACTURING MACHINE

(71) Applicant: JEOL Ltd., Tokyo (JP)

(72) Inventors: Shinichi Kitamura, Tokyo (JP); Nari Tsutagawa, Tokyo (JP); Tatsuo Naruse, Tokyo (JP)

(73) Assignee: JEOL Ltd., Tokyo (JP)

( * ) Notice: Subject to any disclaimer, the term of this patent is extended or adjusted under 35 U.S.C. 154(b) by 384 days.

(21) Appl. No.: 17/012,449

(22) Filed: Sep. 4, 2020

(65) Prior Publication Data

US 2021/0069975 A1 Mar. 11, 2021

(30) Foreign Application Priority Data

Sep. 6, 2019 (JP) .................................. 2019-162569
Jul. 22, 2020 (JP) .................................. 2020-125208

(51) Int. Cl.
*B29C 64/218* (2017.01)
*B29C 64/321* (2017.01)
(Continued)

(52) U.S. Cl.
CPC .......... *B29C 64/218* (2017.08); *B29C 64/153* (2017.08); *B29C 64/232* (2017.08);
(Continued)

(58) Field of Classification Search
CPC ... B29C 64/153; B29C 64/205; B29C 64/214; B29C 64/218; B29C 64/245;
(Continued)

(56) References Cited

U.S. PATENT DOCUMENTS

2003/0059492 A1 3/2003 Gaillard et al.
2015/0306666 A1* 10/2015 Honda ................... B33Y 30/00
425/78
(Continued)

FOREIGN PATENT DOCUMENTS

CN 207059239 U 3/2018
CN 108638512 A 10/2018
(Continued)

OTHER PUBLICATIONS

Partial European Search Report issued in EP20194848.6 dated Oct. 23, 2020.
(Continued)

*Primary Examiner* — Jerzi H Moreno Hernandez
(74) *Attorney, Agent, or Firm* — The Webb Law Firm

(57) ABSTRACT

An additive manufacturing machine is provided which can smooth out powdered material while preventing mechanical interference between a smoothing plate and a manufacturing box. The additive manufacturing machine has a support stage, a manufacturing box, and a powder feeder mechanism. The powder feeder mechanism feeds powdered material onto the support stage and smooths out the powdered material. The powder feeder mechanism has an arm portion, a guide mechanism, a connective portion, and a drive mechanism. The guide mechanism is secured to the manufacturing box and supports the arm portion such that it can move in a first direction. The connective portion is connected to the arm portion and transmits force to the arm portion only in the first direction. The drive mechanism is secured to a support member different from the manufacturing box and has a drive portion for moving the connective portion in the first direction.

22 Claims, 14 Drawing Sheets

(51) Int. Cl.
*B29C 64/153* (2017.01)
*B29C 64/232* (2017.01)
*B29C 64/245* (2017.01)
*B33Y 30/00* (2015.01)

(52) U.S. Cl.
CPC .......... *B29C 64/245* (2017.08); *B29C 64/321* (2017.08); *B33Y 30/00* (2014.12)

(58) Field of Classification Search
CPC ..... B29C 64/232; B29C 64/321; B33Y 30/00; B22F 12/60; B22F 12/63; B22F 12/67
See application file for complete search history.

(56) References Cited

U.S. PATENT DOCUMENTS

| | | | |
|---|---|---|---|
| 2019/0039135 A1 | 2/2019 | Hollahan | |
| 2019/0047220 A1* | 2/2019 | Ojima | B29C 64/214 |
| 2019/0255775 A1 | 8/2019 | Kao et al. | |
| 2020/0376761 A1* | 12/2020 | Sweetland | B29C 64/214 |
| 2021/0245254 A1* | 8/2021 | Kitamura | B33Y 30/00 |

FOREIGN PATENT DOCUMENTS

| | | | |
|---|---|---|---|
| EP | 2386404 A1 | | 11/2011 |
| JP | 2015193134 A | * | 11/2015 |
| JP | 2015193134 A | | 11/2015 |
| JP | 201858281 A | | 4/2018 |
| JP | 2019007072 A | | 1/2019 |
| JP | 2019523158 A | | 8/2019 |
| WO | 2018227229 A1 | | 12/2018 |

OTHER PUBLICATIONS

Extended European Search Report issued in EP20194848.6 dated Jan. 13, 2021.
Office Action issued in JP 2020-125208 dated Jul. 13, 2021.

* cited by examiner

FIG. 7
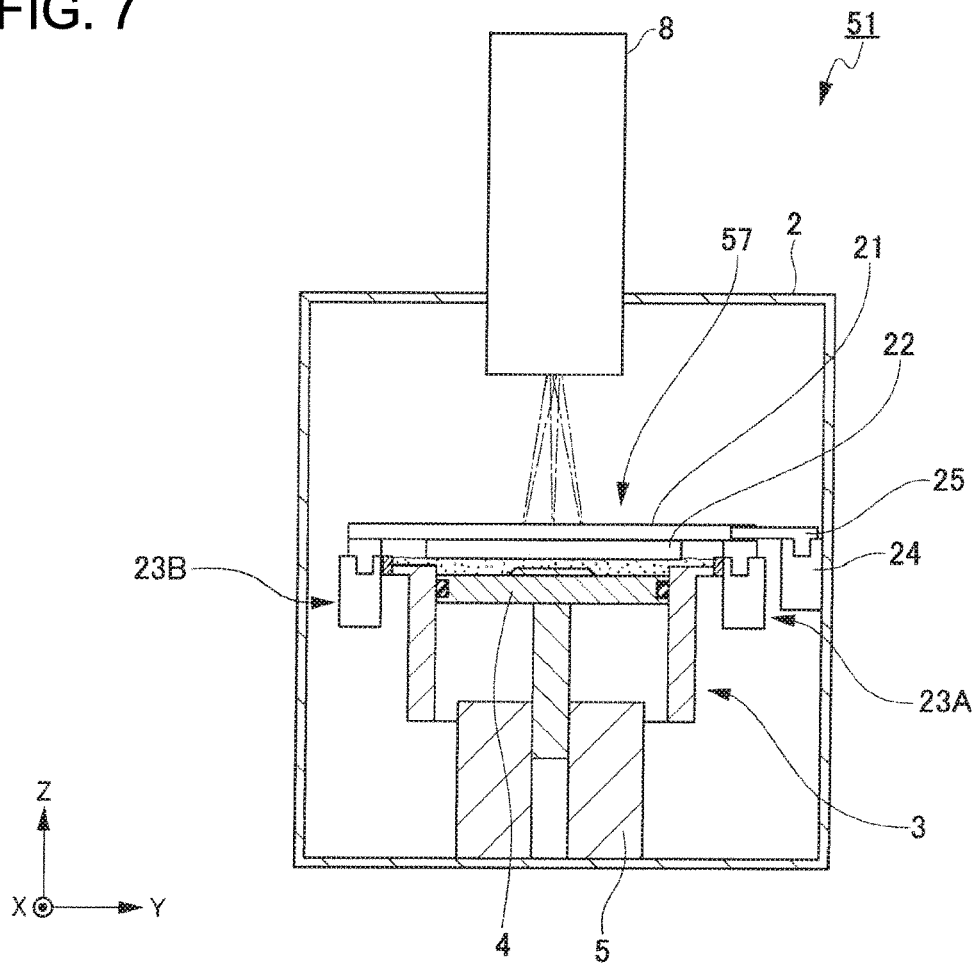
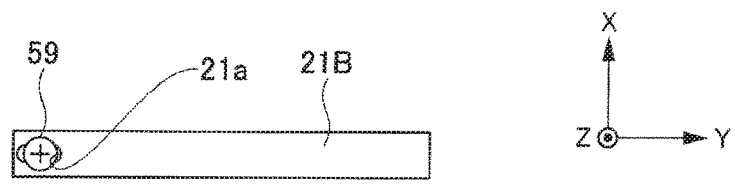
FIG. 8A
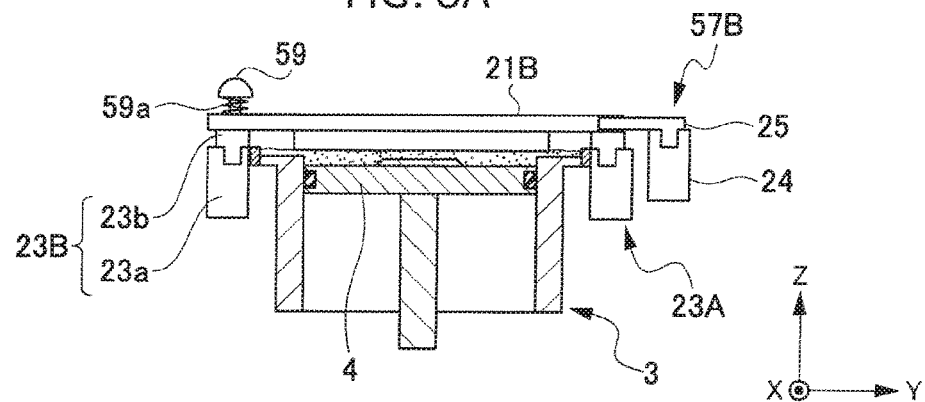
FIG. 8B

ADDITIVE MANUFACTURING MACHINE

CROSS-REFERENCE TO RELATED APPLICATIONS

This application claims priority to Japanese Patent Application Nos. 2019-162569 filed Sep. 6, 2019 and 2020-125208 filed Jul. 22, 2020, the disclosures of which are hereby incorporated by reference in their entirety.

BACKGROUND OF THE INVENTION

1. Field of the Invention

The present invention relates to an additive manufacturing machine for manufacturing a three-dimensional object by successively stacking thin layers of a powdered material on a support stage.

2. Description of the Related Art

In recent years, additive manufacturing for manufacturing a three-dimensional (3D) object on a layer-by-layer basis by laying down a powdered material as stacked thin layers has attracted attention. Various types of additive manufacturing techniques have been developed utilizing different powdered materials and different 3D object fabrication techniques.

One known method of additive manufacturing starts with laying down a powdered material, for example, as stacked layers on the top surface of a powder support stage on a layer-by-layer basis. Then, only a two-dimensional structure portion of the layers of the powdered material over the stage which corresponds to one cross section through a 3D object to be built is molten by a heating mechanism consisting of an electron beam or laser beam. Such molten layers of the powdered material are stacked successively in the heightwise direction (z-direction) to thereby create the 3D object (see, for example, JP-A-2019-7072)

Also, JP-A-2019-7072 sets forth that a powder feeder makes sliding movement, i.e., moves over a manufacturing box, to thereby smooth out powdered material and that a layer of the powder is consequently formed on the support stage.

With the technique set forth in JP-A-2019-7072, however, if the operation for creating the 3D object is performed for a long time, the manufacturing box accommodating the 3D object being created becomes heated and thermally expands. This presents the possibility that the smoothing plate of the powder feeder mechanism may mechanically interfere with the manufacturing box.

Furthermore, the technique set forth in JP-A-2019-7072 suffers from the problem that vibrations of the mechanical drive portion is transmitted to the smoothing plate, whereby the powdered material cannot be smoothed out.

SUMMARY OF THE INVENTION

In view of the foregoing problems, the present invention has been made. It is an object of the present invention to provide an additive manufacturing machine which has a smoothing plate and a manufacturing box and which is capable of smoothing out a powdered material while preventing mechanical interference between the smoothing plate and the manufacturing box.

An additive manufacturing machine which achieves the above-described object in accordance with the teachings of the present invention has a support stage, a manufacturing box, and a powder feeder mechanism. A powdered material for manufacturing a three-dimensional (3D) object is stacked as a series of layers on the support stage. The manufacturing box has a cylindrical portion on which the support stage is slidably disposed. The powder feeder mechanism feeds the powdered material onto the support stage and smooths out the powdered material.

The powder feeder mechanism has an arm portion, a guide mechanism, a connective portion, and a drive mechanism. A smoothing plate for smoothing out the powdered material is fixedly secured to the arm portion. The guide mechanism is secured to the manufacturing box and supports the arm portion such that the arm portion can move in a first direction that is parallel to one surface of the support stage which defines a working surface. The connective portion is connected to the arm portion and transmits mechanical force to the arm portion only in the first direction. The drive mechanism is secured to a support member different from the manufacturing box and has a drive portion for moving the connective portion in the first direction.

According to the inventive additive manufacturing machine, the powdered material can be smoothed out while preventing mechanical interference between the smoothing plate and the manufacturing box.

BRIEF DESCRIPTION OF THE DRAWINGS

FIG. 7 is a schematic cross-sectional view of an additive manufacturing machine associated with a second embodiment of the present invention.

FIG. 8A is a plan view of an arm portion of a modification of the additive manufacturing machine of FIG. 7.

FIG. 8B is a schematic cross-sectional view of a powder feeder mechanism of the modification of the additive manufacturing machine of FIG. 7.

DESCRIPTION OF THE INVENTION

Figure 1:
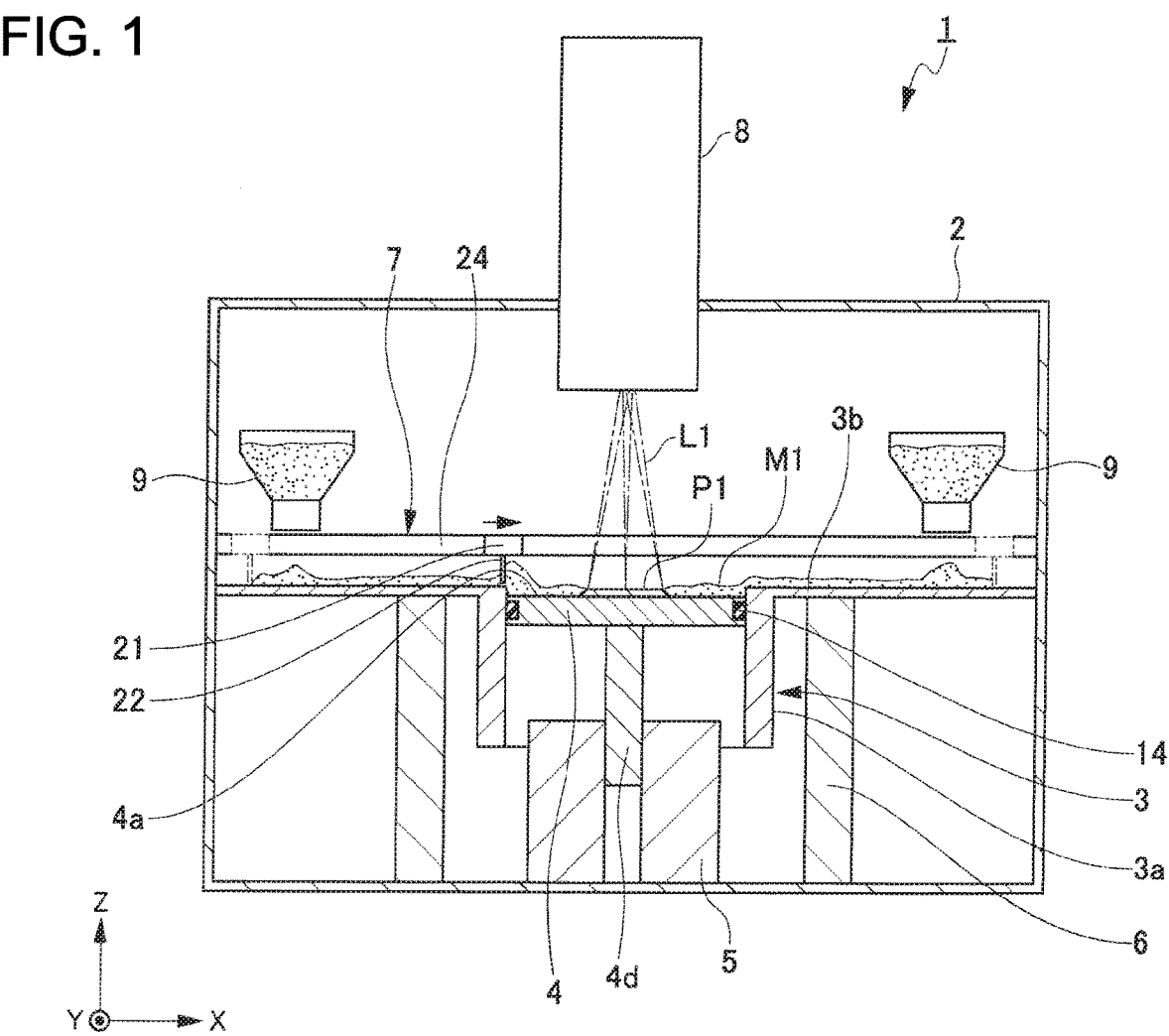
FIG. 1 is a schematic cross-sectional view of an additive manufacturing machine associated with a first embodiment of the present invention.

The preferred embodiments of the additive manufacturing machine of the present invention are hereinafter described with reference to FIGS. 1 to 18. In various figures, like components are indicated by like reference numerals.

1. First Embodiment

1-1. Configuration of Additive Manufacturing Machine

First, a first embodiment of the additive manufacturing machine of the present invention is described by referring to FIG. 1, which is a schematic cross-sectional view of the additive manufacturing machine.

The additive manufacturing machine shown in FIG. 1 is generally indicated by reference numeral 1 and operates to build a three-dimensional object by irradiating a powdered material such as a powdered metal (e.g., titanium, aluminum, or iron) with an electron beam to melt the material, and stacking layers of the solidified powdered material on top of each other.

As shown in FIG. 1, the additive manufacturing machine 1 has a hollow processing chamber 2, a manufacturing box 3, a support stage 4 in the form of a flat plate, a stage drive mechanism 5, a support base 6, a powder feeder mechanism 7, an electron gun 8, and powder tanks or reservoirs 9. It is assumed that the support stage 4 has one surface (working surface) 4a parallel to a first direction X and that a second direction Y is perpendicular to the first direction X and parallel to the working surface 4a of the stage 4. It is also assumed that a direction perpendicular to the working surface 4a of the support stage 4 is a third direction Z.

A vacuum pump (not shown) is connected to the processing chamber 2. The air inside the processing chamber 2 is evacuated by the vacuum pump and so the inside of the processing chamber 2 is maintained as a vacuum. The manufacturing box 3, support stage 4, stage drive mechanism 5, support base 6, powder feeder mechanism 7, and powder reservoirs 9 are arranged inside the processing chamber 2. The electron gun 8 is mounted to the front end of the processing chamber 2 as viewed in the third direction Z, i.e., at the top of the processing chamber 2. The manufacturing box 3 is supported on the support base 6 and placed at a position opposite to the electron gun 8 in the third direction Z.

The manufacturing box 3 has a cylindrical portion 3a and a flange portion 3b representing a reference plate. The axial direction of the cylindrical portion 3a is parallel to the third direction Z. The cylindrical portion 3a has open opposite end portions in the third direction Z. A powdered material M1 fed by the powder feeder mechanism 7 (described later) and a three-dimensional object built from the material M1 are accommodated in the hollow interior of the cylindrical portion 3a.

The flange portion 3b is formed at the outer fringes of the upper end of the cylindrical portion 3a that is at the front end in the third direction Z. The flange portion 3b is bent substantially vertically from the outer fringes of the cylindrical portion 3a. The flange portion 3b is placed parallel to the first direction X and to the second direction Y. A fringe portion 3c (see FIG. 2) is formed at the outer fringes of the flange portion 3b and protrudes in the positive third direction Z.

The flange portion 3b is supported on the support base 6 that is disposed inside the processing chamber 2. Therefore, the axial front end of the cylindrical portion 3a of the manufacturing box 3, i.e., upper end, is a fixed end, while the axial rear end of the cylindrical portion 3a, i.e., lower end, is a free end. The structure of the manufacturing box 3 and the structure of the support base 6 that supports the manufacturing box 3 are described in detail later.

The powder reservoirs 9 for storing the powdered material M1 are disposed at opposite ends of the flange portion 3b in the first direction X. Also, the powder reservoirs 9 are disposed over the front end of the flange portion 3b in the third direction Z, i.e., above the flange portion 3b. A volumetric feeder for dispensing a given amount of powdered material M1 is arranged on the side of a respective one of the powder reservoirs 9 which is opposite to the flange portion 3b. Each volumetric feeder feeds a given amount of powdered material M1 to the flange portion 3b.

The powder feeder mechanism 7 is disposed between the horizontal array of the powder reservoirs 9 and the flange portion 3b. The feeder mechanism 7 carries the powdered material M1 from the flange portion 3b onto the support stage 4 and spreads the material M1 over the support stage 4. The structure of the powder feeder mechanism 7 is described in detail later.

Inside the cylindrical portion 3a of the manufacturing box 3, the support stage 4 is arranged so as to be slidable in the third direction Z. The support stage 4 is shaped like a flat plate. The powdered material M1 is stacked in layers on the working surface 4a of the support stage 4 that is at the front end in the third direction Z. A slidable member 14 having heat resistance and flexibility is mounted on the lateral end of the support stage 4. The slidable member 14 is in slidable contact with the inner wall surface of the cylindrical portion 3a.

A shank or shaft portion 4d is mounted to the opposite surface of the support stage 4 which faces away from the working surface 4a. The shaft portion 4d protrudes from this opposite surface of the support stage 4 in the negative third direction Z. The shaft portion 4d is connected to the stage drive mechanism 5 that is disposed at the rear end of the manufacturing box 3 in the third direction Z. The stage drive mechanism 5 supports the support stage 4 via the shaft portion 4d such that it can move in the third direction Z. A drive portion which drives the shaft portion 4d and consists, for example, of a rack-and-pinion or a ball screw may be suitably used as the stage drive mechanism 5.

The working surface 4a of the support stage 4 is located opposite to the electron gun 8 mounted in the processing chamber 2. The electron gun 8 representing one example of a heating mechanism emits an electron beam L1 toward the powdered material M1 in accordance with two-dimensional shapes obtained by incrementally slicing a pre-designed 3D model (e.g., a model of a 3D object represented by three-dimensional CAD (computer-aided design) data). As a result, the regions of the powdered material which correspond to the two-dimensional shapes are molten.

1-2. Configuration of Powder Feeder Mechanism

Figure 2:
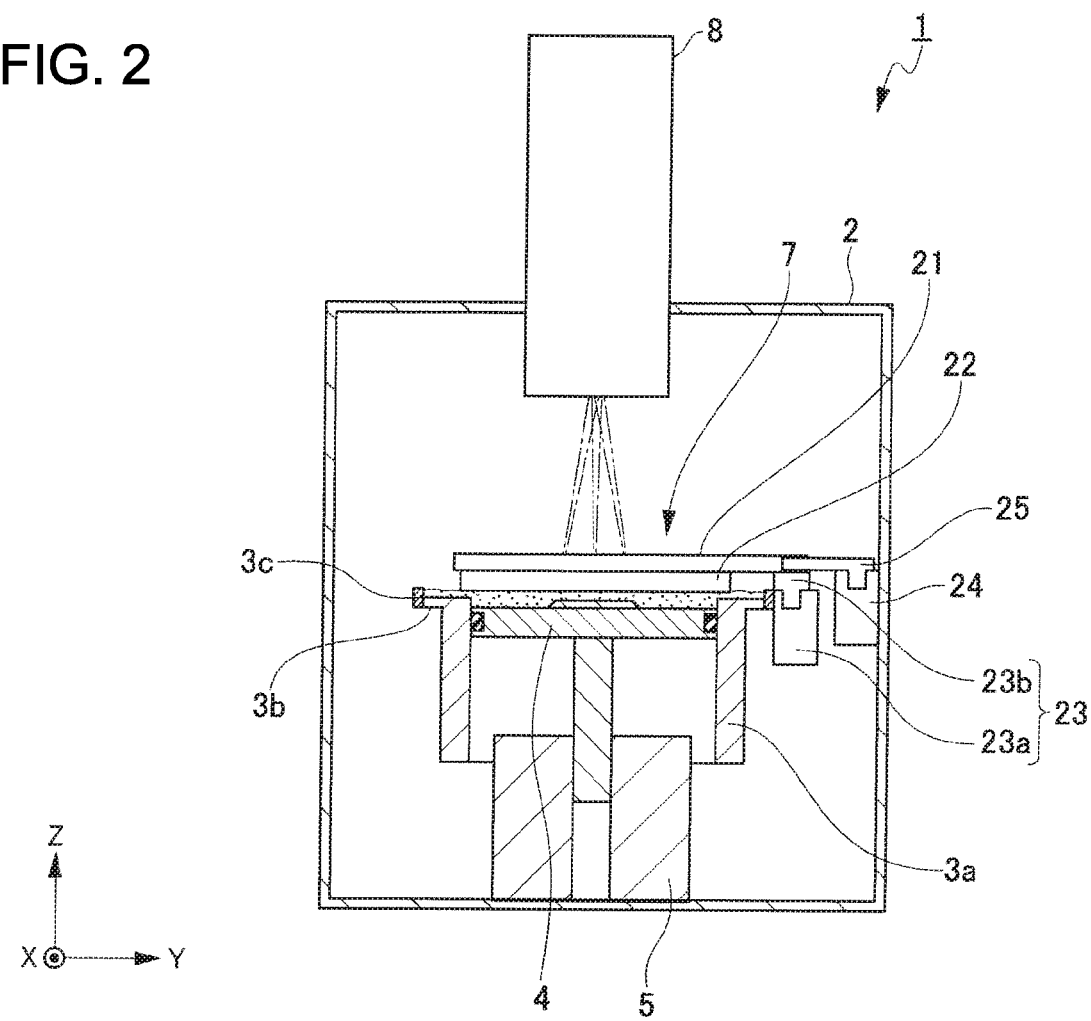
FIG. 2 is a cross-sectional view similar to FIG. 1, but taken from a different direction.
Figure 3:
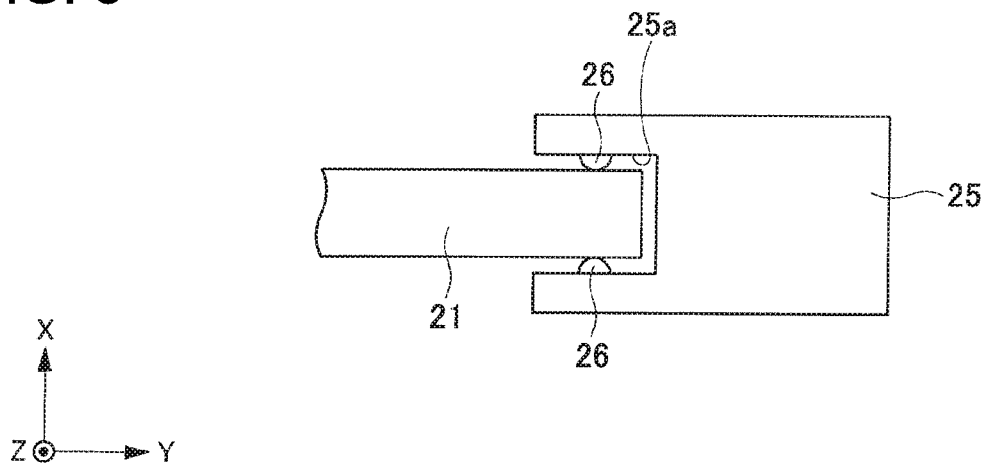
FIG. 3 is a plan view illustrating the manner in which a connective portion and an arm portion of the additive manufacturing machine shown in FIGS. 1 and 2 are connected together.

The configuration of the powder feeder mechanism 7 is next described in detail by referring to FIGS. 1-3. FIG. 2 is a cross-sectional view of the additive manufacturing machine 1, similar to FIG. 1, but taken from a different direction. As shown in FIGS. 1 and 2, the powder feeder mechanism 7 has an arm portion 21, a smoothing plate 22, a guide mechanism 23, a drive mechanism 24, and a connective portion 25.

The guide mechanism 23 has a guide rail 23a and a slider 23b. The guide rail 23a is held to the front end of the flange portion 3b of the manufacturing box 3 in the second direction Y. The guide rail 23a extends parallel to the first direction X. The slider 23b is slidably supported on the guide rail 23a. The arm portion 21 is connected to the slider 23b.

The arm portion 21 is made of an elongated member having a given length. The slider 23b is securely fixed to one longitudinal end of the arm portion 21. The arm portion 21 is supported to the guide mechanism 23. The longitudinal direction of the arm portion 21 is parallel to the second direction Y. The longitudinal length of the arm portion 21 is set greater than at least the length from one end of the support stage 4 to the other end in the second direction Y. Therefore, the arm portion 21 extends from one end of the support stage 4 to the other end in the second direction Y. The smoothing plate 22 is mounted to the rear end of the arm portion 21 in the third direction Z, the rear end being opposite to the manufacturing box 3 and to the support stage 4.

The smoothing plate 22 is shaped generally in the form of a planar plate. The longitudinal direction of the smoothing plate 22 extends parallel to the second direction Y in the same way as the arm portion 21. As the arm portion 21 and the smoothing plate 22 move along the guide rail 23a of the guide mechanism 23 in the first direction X, the powdered material M1 is fed onto the working surface 4a of the support stage 4 and smoothed out at a given height in the third direction Z. Consequently, a powder layer of the powdered material M1 is formed on the working surface 4a of the support stage 4.

The guide mechanism 23 that supports the arm portion 21 is rigidly fixed to the manufacturing box 3 and so if the box 3 expands thermally and becomes displaced in the third direction Z, the arm portion 21 and the guide mechanism 23 are also displaced in the third direction Z together with the manufacturing box 3. This can maintain constant the positional relationship of the manufacturing box 3 to the arm portion 21 and the smoothing plate 22. Consequently, it is possible to prevent mechanical interference of the arm portion 21 and the smoothing plate 22 with the manufacturing box 3.

The connective portion 25 is connected to the front end of the arm portion 21 in the second direction Y. The connective portion 25 is supported by the drive mechanism 24 so as to be movable in the first direction X. The drive mechanism 24 is fixedly secured to the inner wall surface of the processing chamber 2 on the side of its front end in the second direction Y. The drive mechanism 24 moves the connective portion 25 in the first direction X by means of a chain drive, a belt drive, a gear drive, or other driving means.

FIG. 3 is a plan view illustrating the manner in which the connective portion 25 and the arm portion 21 are connected together. As shown in FIG. 3, the connective portion 25 is provided with a connective recessed portion 25a in which a rear end portion of the arm portion 21 is inserted. The connective recessed portion 25a is recessed in the second direction Y. The opposite ends of the connective recessed portion 25a in the third direction Z and its rear end in the second direction Y are open.

When the rear end portion of the arm portion 21 is inserted in the connective recessed portion 25a, the connective portion 25 supports the arm portion 21 from both sides of the first direction X that is the direction of movement of the arm portion 21. A gap is formed between the front end of the connective recessed portion 25a in the second direction Y and the arm portion 21.

Substantially semispherical abutting pins 26 are mounted to the surface of the connective recessed portion 25a that is opposite to the arm portion 21 in the first direction X. The abutting pins 26 abut on the arm portion 21, each at one point. Preferably, the abutting pins 26 are made of a shock-absorbing material having a relatively low Q and thus can absorb vibrations from the drive mechanism 24.

The connective portion 25 transmits force to the arm portion 21 in the first direction X. As noted above, the opposite ends of the connective recessed portion 25a in the third direction Z are open, and the gap is formed between the arm portion 21 and the front end of the connective recessed portion 25a in the second direction Y. That is, the connective portion 25 transmits force to the arm portion 21 only in its direction of movement, i.e., the first direction X, not either in the second direction Y or in the third direction Z different from the direction of movement of the arm portion 21.

Consequently, transmission of vibrations of the drive mechanism 24 in the second direction Y and third direction Z to the arm portion 21 can be prevented. As a result, the powdered material M1 can be smoothed out by the smoothing plate 22 fixedly mounted to the arm portion 21.

Furthermore, if the arm portion 21 is displaced in the third direction Z by thermal expansion of the manufacturing box 3, the arm portion 21 can be displaced in the third direction Z within the connective recessed portion 25a. In consequence, if the manufacturing box 3 expands thermally, it is possible to prevent application of mechanical load to the point of connection where the connective portion 25 is coupled to the arm portion 21.

The drive mechanism 24 is rigidly secured to the inner wall surface of the processing chamber 2 that is made of a member different from that of the manufacturing box 3. Therefore, during operation of the drive mechanism 24, transmission of the resulting vibrations to the manufacturing box 3 can be suppressed.

In the present embodiment, the processing chamber 2 has been set forth as a support member that provides support of the drive mechanism 24. The present invention is not restricted to this example. It suffices that the support member be made of a member different from that of the manufacturing box 3. For example, the support member may be mounted inside the processing chamber 2.

Furthermore, in the present embodiment, the arm portion 21 and the connective portion 25 have been set forth as being connected together. The invention is not restricted to this example. For example, the connective portion 25 may be connected to the slider 23b of the guide mechanism 23.

1-3. Configuration of Manufacturing Box and Support Structure Therefor

Figure 4:
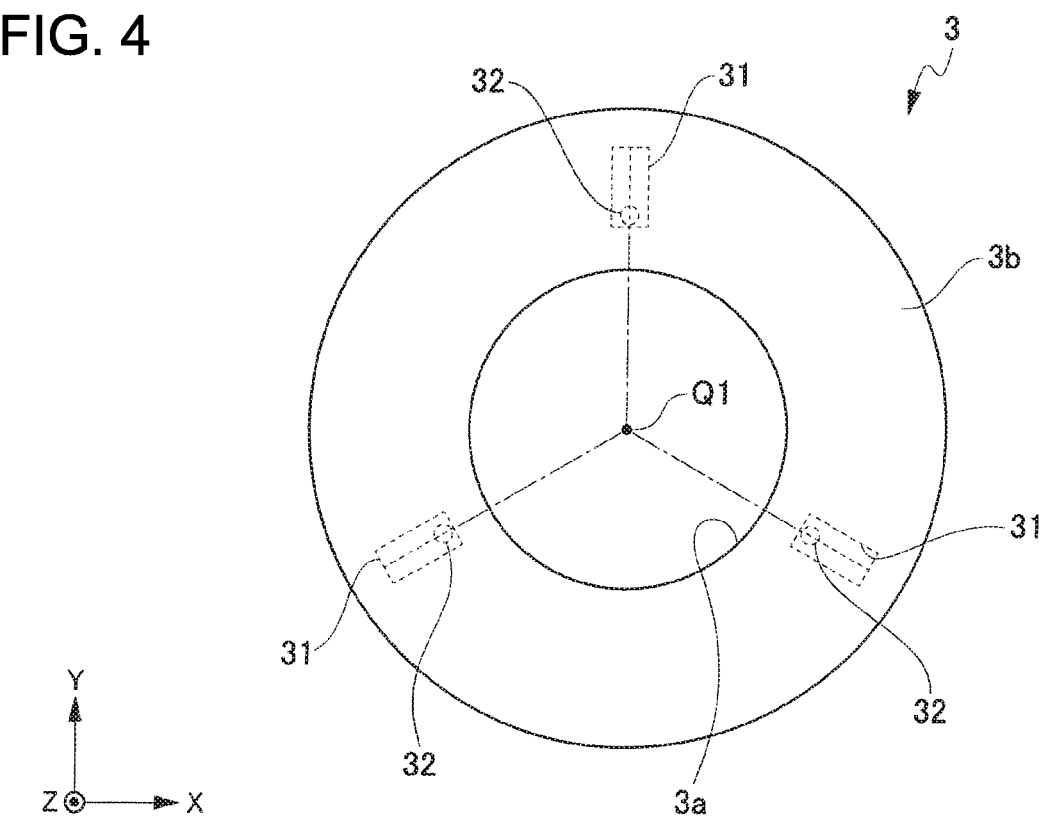
FIG. 4 is a plan view of a manufacturing box of the additive manufacturing machine shown in FIGS. 1-3.
Figure 5:
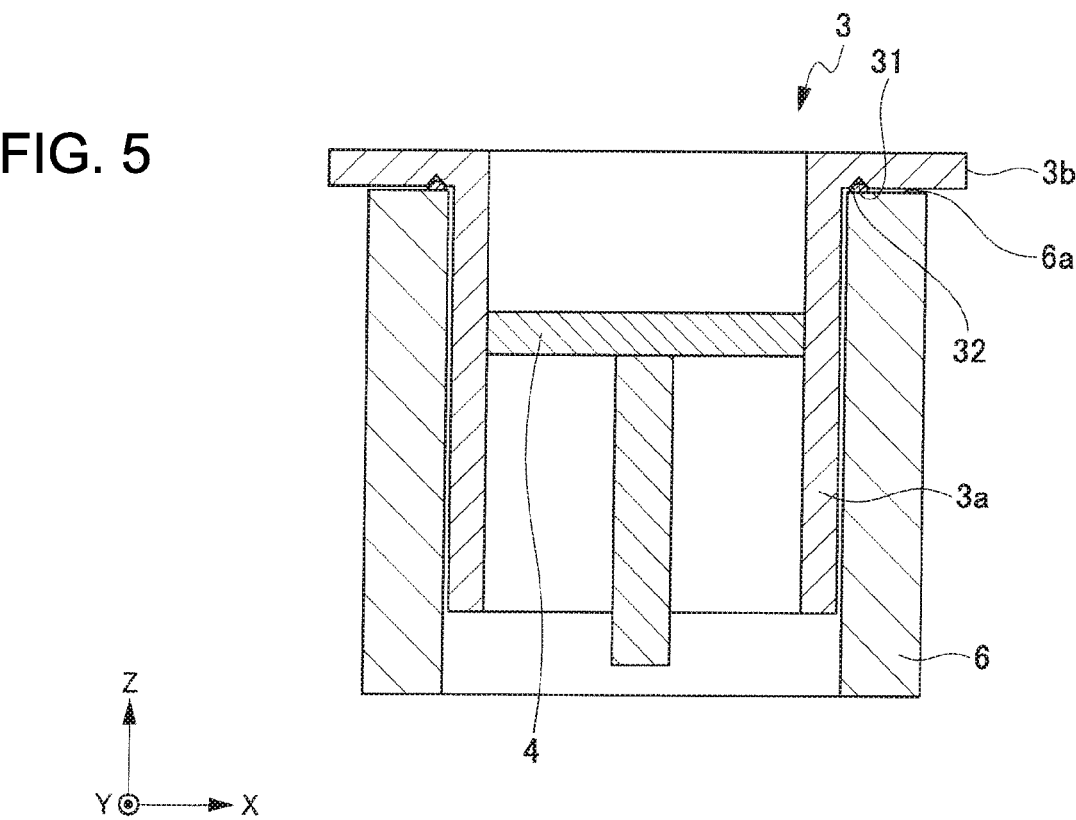
FIG. 5 is a cross-sectional view of the manufacturing box and a support stage of the additive manufacturing machine shown in FIGS. 1-4.

An example of the configuration of the manufacturing box 3 and a support structure for the manufacturing box 3 are next described by referring to FIGS. 4 and 5. FIG. 4 is a plan view of the manufacturing box 3. FIG. 5 is a cross-sectional view of the manufacturing box 3 and the support base 6.

As shown in FIGS. 4 and 5, the cylindrical portion 3a of the manufacturing box 3 is shaped cylindrically. The flange portion 3b is shaped in the form of a circular disk and provided with three support grooves 31 in the rear end surface of the flange portion 3b as viewed in the third direction Z, i.e., in the bottom surface. The three support grooves 31 are equally spaced from each other circumferentially of the flange portion 3b around the cylindrical portion 3a.

Each of the support grooves 31 is recessed like a letter V from the bottom surface of the flange portion 3b in the positive third direction Z, i.e., upwardly. The support grooves 31 have their top portions on the side of the front end of the flange portion 3b in the third direction Z, the top portions extending radially about the center Q1 of the manufacturing box 3. Support pins 32 mounted in and on the support base 6 are inserted into the support grooves 31, respectively. The support grooves 31 are supported by their respective support pins 32 so as to be slidable radially about the center Q1 of the cylindrical portion 3a. The support pins 32 are mounted on a supportive surface 6a of the support base 6 that is at the front end of the support base 6 in the third direction Z. The support grooves 31 and the support pins 32 together constitute a support mechanism or support structure that mechanically supports the manufacturing box 3.

When the manufacturing box 3 is heated, the flange portion 3b expands thermally as well as the cylindrical portion 3a. Therefore, in the conventional additive manufacturing machine described above, there is a difference in coefficient of expansion between those portions of the manufacturing box which are respectively held and not held and, therefore, the manufacturing box is distorted. As a result, when the manufacturing box of the conventional additive manufacturing machine expands thermally, the position of the center Q1 of the manufacturing box shifts, thus deteriorating the fabrication accuracy of additive manufacturing.

In contrast, in the case of the manufacturing box 3 of the present embodiment, if the flange portion 3b expands thermally in the first direction X and in the second direction Y, the three support grooves 31 slide on their respective support pins 32. Because the three support grooves 31 are equidistantly arranged peripherally of the flange portion 3b and because their top portions are arranged radially about the center Q1, the whole flange portion 3b expands uniformly radially outwardly of the flange portion 3b. Consequently, if the manufacturing box 3 expands thermally, the position of the center Q1 of the box 3 can be prevented from varying. Hence, the fabrication accuracy of additive manufacturing can be improved.

The rear end of the cylindrical portion 3a of the manufacturing box 3 in the third direction Z is not fixed but is a free end. Therefore, if the manufacturing box 3 expands thermally, the cylindrical portion 3a expands toward the free end, i.e., the rear end in the third direction Z. This can suppress variation of the position of the front end of the manufacturing box 3 in the third direction Z.

A heat shield (not shown) is disposed between the cylindrical portion 3a of the manufacturing box 3 and the support base 6 to prevent radiation and transfer of heat from the cylindrical portion 3a of the box 3 to the support base 6.

In the present embodiment, the support grooves 31 are formed in the flange portion 3b and slidably supported by the support pins 32. The support mechanism for the manufacturing box 3 is not restricted to this. For example, the support mechanism may be so designed that the support grooves are formed in the support bases 6, and the support pins are mounted to the flange portion 3b. Alternatively, the manufacturing box 3 may be supported by radially extending rails.

In the example set forth above, the manufacturing box 3 is supported at three points by the three support mechanisms. The present invention is not restricted to this example. For example, four or more support mechanisms may be provided, and the manufacturing box 3 may be supported at four or more points.

1-4. Operation of Additive Manufacturing Machine

Figure 6:
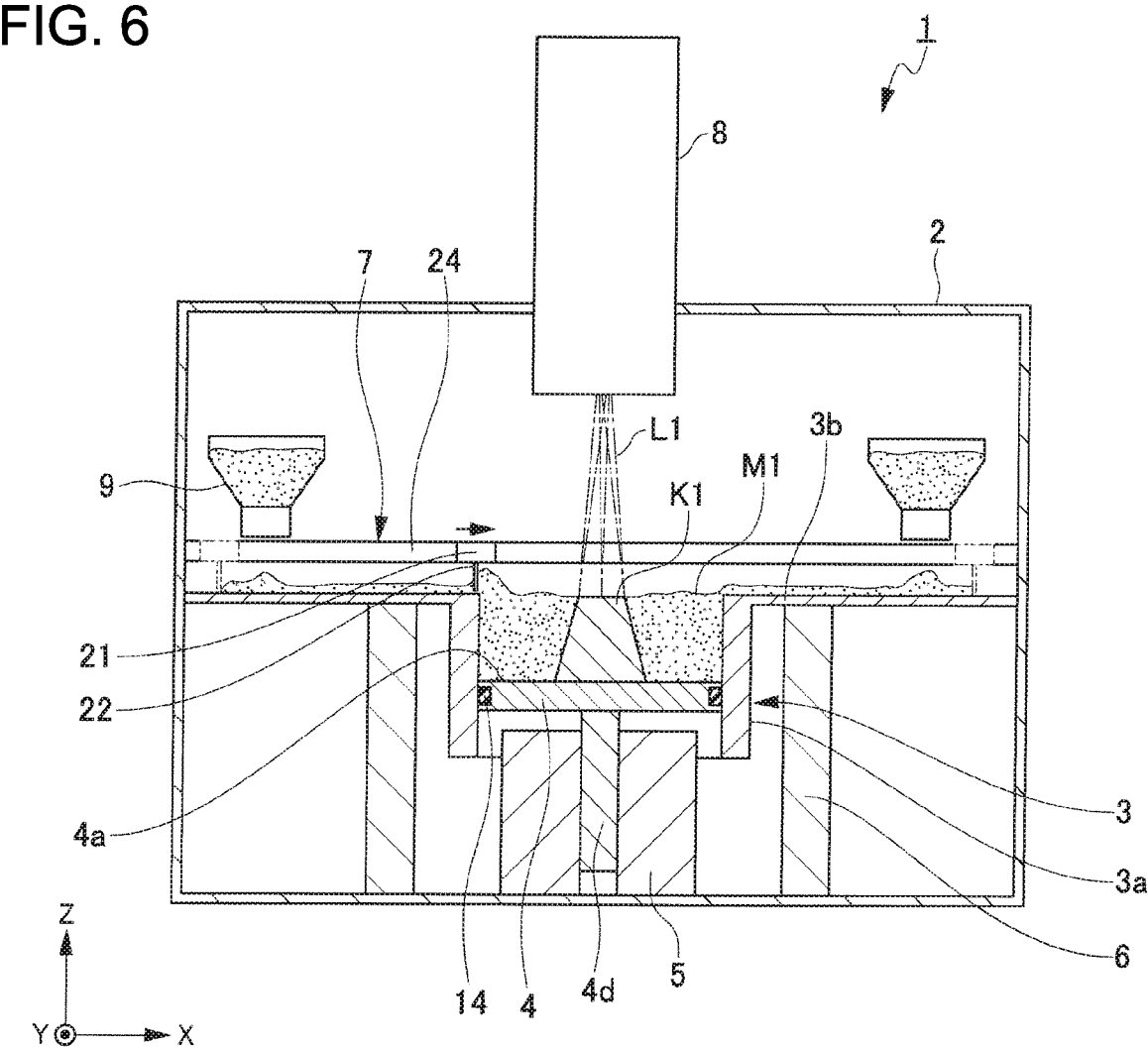
FIG. 6 is a schematic cross-sectional view illustrating the manner in which a three-dimensional object has been built with the additive manufacturing machine shown in FIGS. 1-5.

The operation of the additive manufacturing machine 1 having the configuration described above with reference to FIGS. 1 and 6 is next described. FIG. 6 is a schematic cross-sectional view illustrating the manner in which a three-dimensional object is built with the additive manufacturing machine 1.

First, as shown in FIG. 1, the stage drive mechanism 5 is driven to place the support stage 4 either into a position lower than the top surface of the flange portion 3b of the manufacturing box 3 by a given spacing in the third direction Z or into a position where the working surface 4a of the support stage 4 and the top surface of the flange portion 3b are flush with each other. The given spacing is equal to the thickness, taken in the third direction Z, of the layer of the powdered material M spread subsequently.

Then, the drive mechanism 24 for the powder feeder mechanism 7 is driven to move the connective portion 25 in the first direction X. This moves the arm portion 21 connected to the connective portion 25 along the guide rail 23a of the guide mechanism 23 to thereby cause the powdered material M1 fed out of the powder reservoirs 9 to be carried onto the working surface 4a of the support stage 4. Furthermore, the arm portion 21 moves in the first direction X. As a result, a layer of the powdered material M1 is formed on the working surface 4a of the support stage 4 by the smoothing plate 22.

As described previously, vibrations of the drive mechanism 24 in the second direction Y and in the third direction Z are not transmitted to the arm portion 21 and so a flat layer of the powdered material M1 can be formed on the working surface 4a of the support stage 4.

The electron beam L1 is emitted from the electron gun 8 toward the layer of powdered material M1 in accordance with two-dimensional shapes obtained by slicing a pre-designed three-dimensional model of a 3D object incrementally, i.e., at regular intervals of thickness. As a result, the regions of the powdered material M1 which correspond to the two-dimensional shapes are molten. After a lapse of a given time for the material, the molten powdered material M1 condenses into solidified powder P1.

After one layer of powdered material M1 has molten and solidified, the support stage 4 is lowered by a given height by the stage drive mechanism 5. Then, the powdered material M1 is spread over the immediately previously formed, underlying layer. The electron beam L1 is emitted to the region of the new layer of the powdered material M1 which corresponds to a two-dimensional shape for the new layer, thus melting and solidifying the region of the powdered material M1. These processing steps are repeated to stack molten and solidified layers of powdered material M1 on top of each other. As a result, as shown in FIG. 6, a three-dimensional object K1 is built inside the cylindrical portion 3a of the manufacturing box 3.

When the three-dimensional object K1 is built, if the manufacturing box 3 is heated and expands thermally, the positional relationship of the arm portion 21 and the smoothing plate 22 to the manufacturing box 3 can be maintained constant because the guide mechanism 23 supporting the arm portion 21 and the smoothing plate 22 is arranged within the manufacturing box 3 as described previously. Thus, mechanical interference of the arm portion 21 and the smoothing plate 22 with the manufacturing box 3 can be prevented.

Furthermore, as noted above, neither the position of the center Q1 of the manufacturing box 3 nor the position of the front end of the box 3 in the third direction Z is varied if thermal expansion occurs and, therefore, the positional relationship between the manufacturing box 3 and the electron gun 8 can be maintained constant. Hence, the accuracy at which the three-dimensional object K1 is built can be improved.

2. Second Embodiment

2-1. Example of Configuration of Second Embodiment

An additive manufacturing machine associated with the second embodiment is next described by referring to FIG. 7, which is a schematic cross-sectional view of this additive manufacturing machine.

The additive manufacturing machine associated with the second embodiment is generally indicated by reference numeral 51 and similar to the additive manufacturing machine 1 associated with the first embodiment except for the configuration of the powder feeder mechanism. Therefore, only the powder feeder mechanism is set forth here. Those components of the additive manufacturing machine 51 which are common to their counterparts of the additive manufacturing machine 1 are indicated by the same reference numerals as in the foregoing figures and a repetition of the description thereof is omitted.

As shown in FIG. 7, the powder feeder mechanism 57 has the arm portion 21, the smoothing plate 22, a first guiding mechanism 23A, a second guiding mechanism 23B, the drive mechanism 24, and the connective portion 25. The first guiding mechanism 23A is disposed at the front end of the flange portion 3b of the manufacturing box 3 in the second direction Y. The second guiding mechanism 23B is disposed at the rear end of the flange portion 3b of the manufacturing box 3 in the second direction Y.

The arm portion 21 has a longitudinal front end, i.e., front end in the second direction Y, supported by the first guiding mechanism 23A. The longitudinal rear end of the arm portion 21, i.e., the rear end in the second direction Y, is supported by the second guiding mechanism 23B. Therefore, the arm portion 21 is supported at its opposite longitudinal ends (as viewed in the second direction Y) by the first guiding mechanism 23A and the second guiding mechanism 23B. Consequently, when the arm portion 21 moves in the first direction X, the resulting vibrations can be suppressed.

The additive manufacturing machine 51 having the powder feeder mechanism 57 described just above can yield advantageous effects similar to those produced by the additive manufacturing machine 1 associated with the first embodiment.

2-2. Modified Embodiment

A modification of the additive manufacturing machine associated with the second embodiment is next described by referring to FIGS. 8A and 8B. FIG. 8A is a plan view of the arm portion. FIG. 8B is a schematic cross-sectional view of the powder feeder mechanism.

As shown in FIG. 8A, a fixed slot 21a is formed at the longitudinal rear end of the arm portion 21B in the second direction Y. The slot 21a is elongated over a given length in the second direction Y. As shown in FIGS. 8A and 8B, a set screw 59 has a shank inserted in the fixed slot 21a. The rear end of the arm portion 21B in the second direction Y is mounted to the slider 23b of the second guiding mechanism 23B by the set screw 59.

A compression coil spring 59a is interposed as a biasing member between the head of the set screw 59 and the rear end of the arm portion 21B. The rear end of the arm portion 21B is biased toward the slider 23b by the compression coil spring 59a. Consequently, the rear end of the arm portion 21B is supported to the slider 23b of the second guiding mechanism 23B so as to be slidable in the second direction Y.

The biasing member is not limited to the compression coil spring 59a. Alternatively, a leaf spring or various other members made of rubber or other resilient material may also be used.

With the powder feeder mechanism 57B associated with this modified embodiment, if the arm portion 21B elongates in the second direction Y due to thermal expansion, the rear end of the arm portion 21B slides in the second direction Y while supported by the set screw 59. This can prevent application of mechanical load to the arm portion 21B, first guiding mechanism 23A, and second guiding mechanism 23B if thermal expansion occurs.

In other respects, the additive manufacturing machine associated with the modified embodiment is similar in configuration to the additive manufacturing machine 1 associated with the first embodiment and so a description of such similarities is omitted. The additive manufacturing machine having this powder feeder mechanism 57B can yield advantageous effects similar to those produced by the additive manufacturing machine 1 associated with the first embodiment.

3. Third Embodiment

Figure 9:
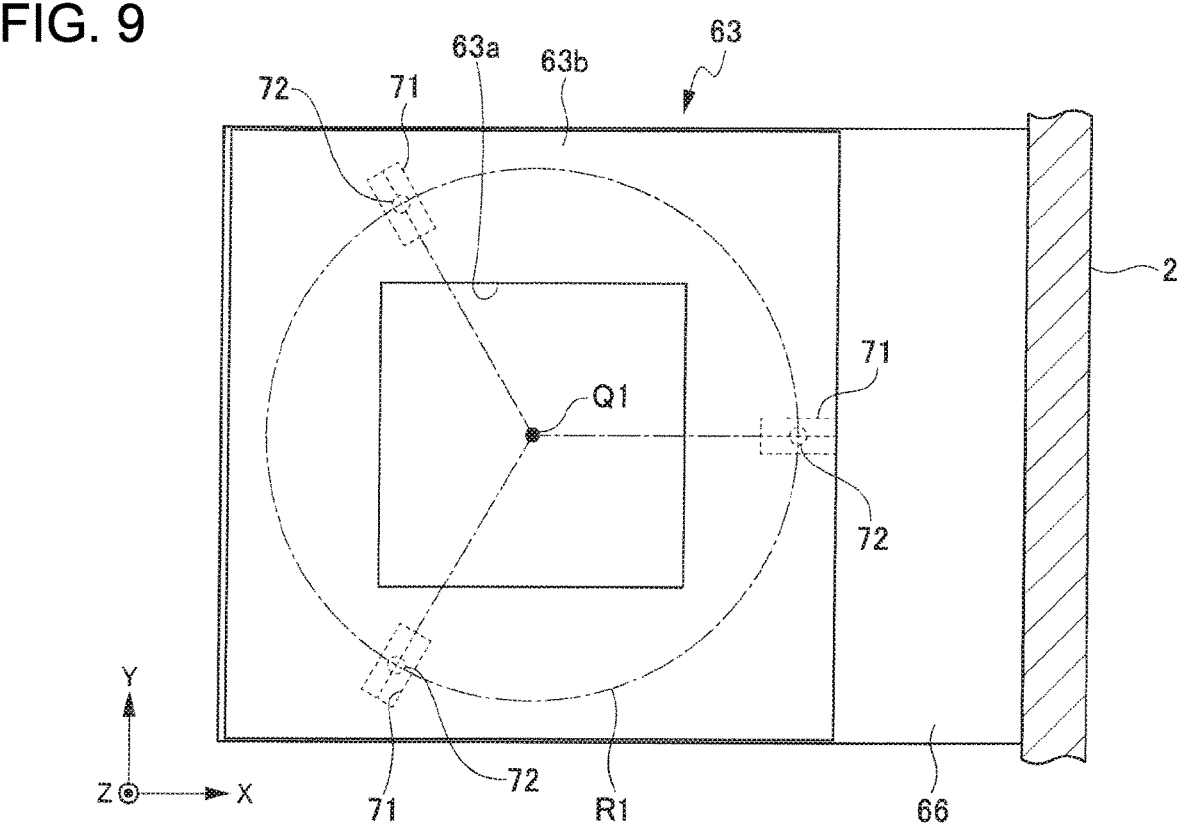
FIG. 9 is a plan view of a manufacturing box and a support base of an additive manufacturing machine associated with a third embodiment of the invention.
Figure 10:
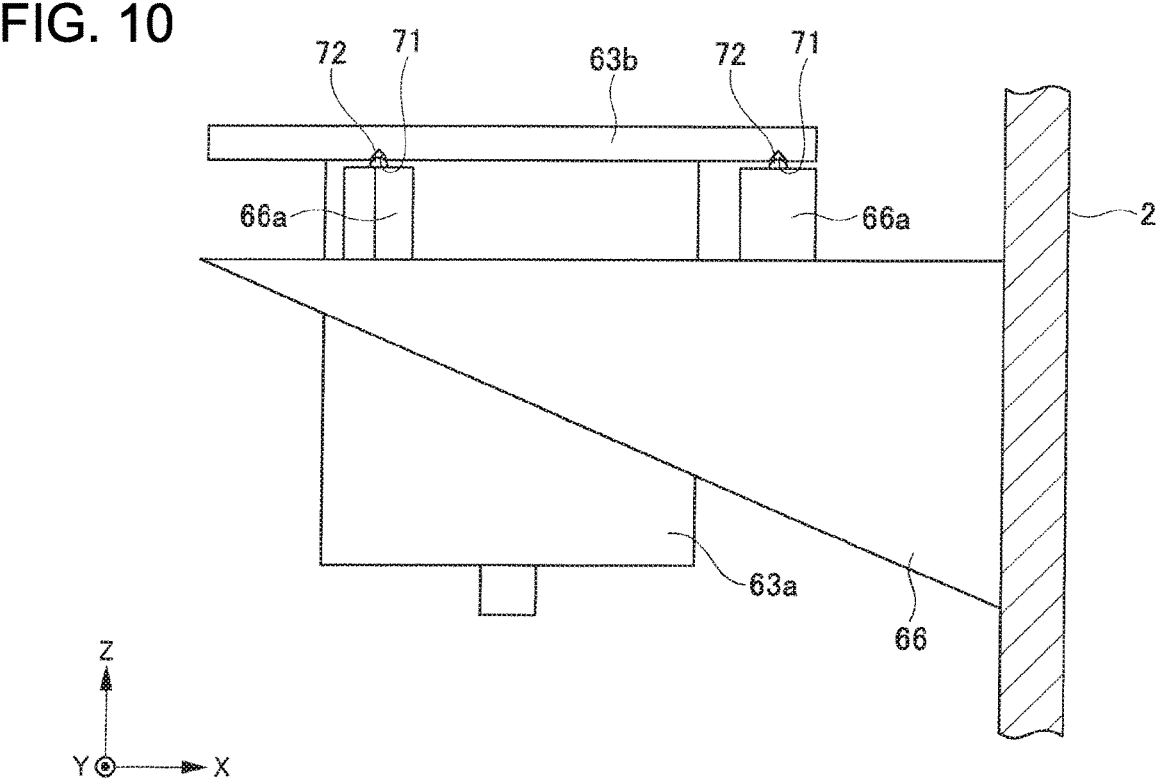
FIG. 10 is a side elevation of the manufacturing box and the support base of the additive manufacturing machine of FIG. 9.

An additive manufacturing machine associated with a third embodiment is next described by referring to FIGS. 9 and 10. FIG. 9 is a plan view of the manufacturing box and support base of the additive manufacturing machine associated with the third embodiment. FIG. 10 is a side elevation of the manufacturing box and support base.

The additive manufacturing machine associated with the third embodiment is similar to the additive manufacturing machine 1 associated with the first embodiment except for the configurations of the manufacturing box and support base. Therefore, only the manufacturing box and support base are described herein, and those components of this additive manufacturing machine which are common to their counterparts of the additive manufacturing machine 1 associated with the first embodiment are indicated by the same reference numerals as in the foregoing figures and a repetition of the description thereof is omitted.

As shown in FIGS. 9 and 10, a manufacturing box 63 has a cylindrical portion 63a of square cross section and a rectangular flange portion 63b. The flange portion 63b is provided with three support grooves 71 in the rear end surface (i.e., the bottom surface) of the flange portion 63b as taken in the third direction Z.

The three support grooves 71 are arranged at regular intervals circumferentially of a virtual circle R1. The center Q1 of the virtual circle R1 lies at the center of gravity of the manufacturing box 63. Each support groove 71 is recessed like a letter V. The support grooves 71 have their respective top portions at their front ends in the third direction Z, and these top portions extend radially about the center Q1. Support pins 72 are mounted on the support base 66 (described later) and inserted into the support grooves 71, respectively. The flange portion 63b of the manufacturing box 63 is supported by the support base 66.

The support base 66 is rigidly secured to the inner wall surface of the processing chamber 2 and protrudes from the inner wall surface of the processing chamber 2 in the first direction X. The support base 66 is opposite to the flange portion 63b around the cylindrical portion 63a of the manufacturing box 63. The support base 66 has three support portions 66a which protrude in the positive third direction Z from the front end surface of the support base 66 as viewed in the third direction Z.

The three support portions 66a are opposite to the three support grooves 71, respectively, formed in the flange portion 63b. Support pins 72 to be inserted into the support grooves 71 are mounted to the support portions 66a, respectively. When the flange portion 63b of the manufacturing box 63 expands thermally, the support grooves 71 slide over the support pins 72, respectively.

In other respects, the additive manufacturing machine associated with the third embodiment is similar in configuration with the additive manufacturing machine 1 associated with the first embodiment and so a description of such similarities is omitted. The additive manufacturing machine having these manufacturing box 63 and support base 66 can yield advantageous effects similar to those provided by the additive manufacturing machine 1 associated with the first embodiment.

4. Fourth Embodiment

Figure 11:
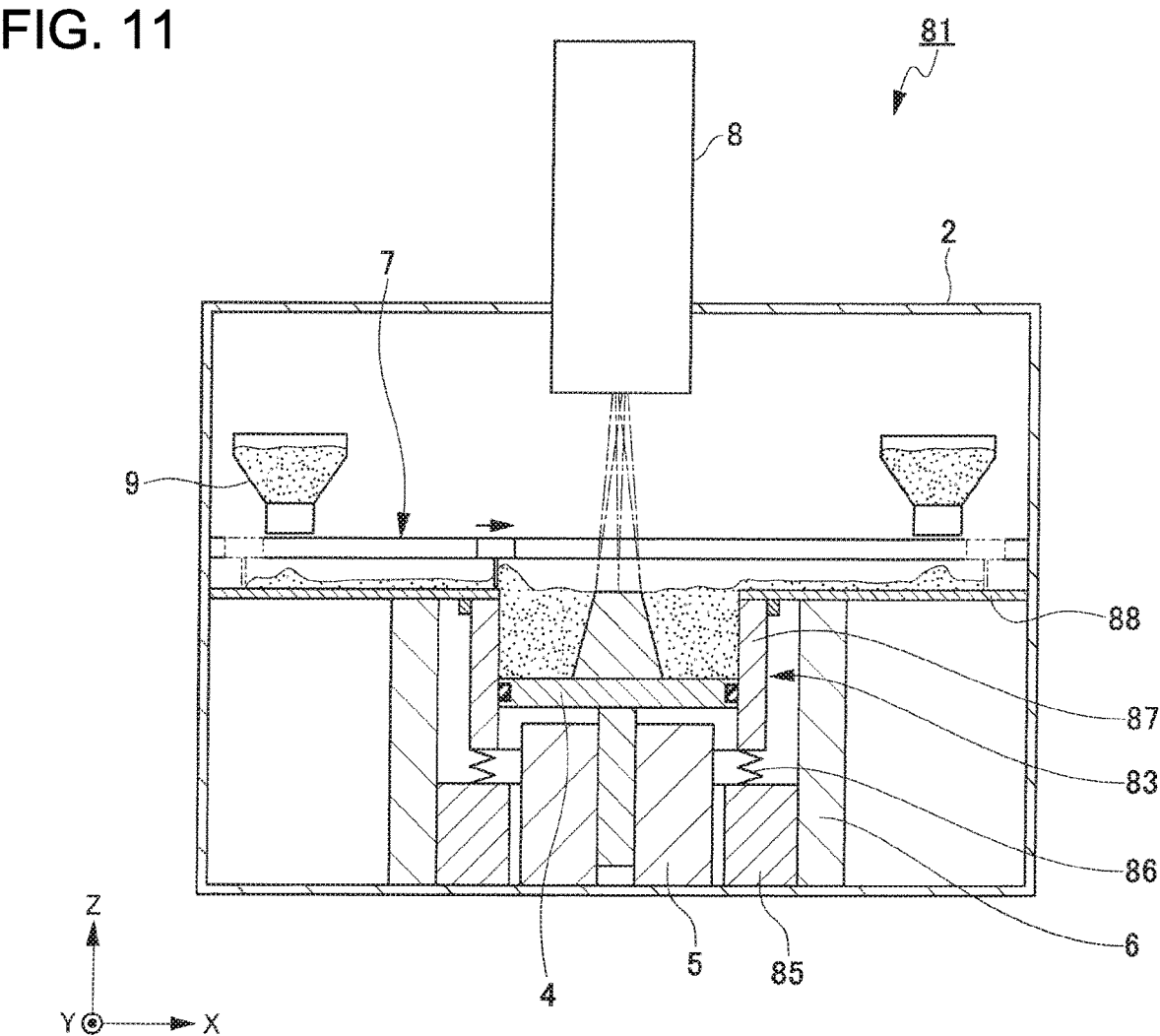
FIG. 11 is a schematic cross-sectional view of an additive manufacturing machine associated with a fourth embodiment of the invention.

An additive manufacturing machine associated with a fourth embodiment is next described by referring to FIG. 11, which is a schematic cross-sectional view of this additive manufacturing machine.

The additive manufacturing machine associated with the fourth embodiment is generally indicated by reference numeral 81 and similar to the additive manufacturing machine 1 associated with the first embodiment except for the configurations of a manufacturing box and of support mechanisms for the manufacturing box. Therefore, only the manufacturing box and support mechanisms for the manufacturing box are described here. Those components of the additive manufacturing machine 81 which are common to their counterparts of the additive manufacturing machine 1 associated with the first embodiment are indicated by the same reference numerals as in the foregoing figures and a repetition of the description thereof is omitted.

As shown in FIG. 11, the manufacturing box, 83, has a cylindrical portion 87 and a reference plate 88 in the form of a flat plate. The reference plate 88 is firmly secured to the support base 6 and to the inner wall surface of the processing chamber 2. A guide mechanism for the powder feeder mechanism 7 is held to the reference plate 88. The cylindrical portion 87 is detachably mounted to the rear end surface of the reference plate 88 in the third direction Z, i.e., the bottom surface.

The support stage 4 that is moved in the third direction Z by the stage drive mechanism 5 is disposed in the interior of the cylindrical portion 87. The front end of the cylindrical portion 87 in the third direction Z is in abutment with the bottom surface of the reference plate 88. A push spring 86 representing a push mechanism is mounted to the rear end of the cylindrical portion 87 in the third direction Z.

The front end of the push spring 86 in the third direction Z is mounted to the cylindrical portion 87, while the rear end of the spring 86 in the third direction Z is mounted to a spring receiving portion 85 mounted in the processing chamber 2. The push spring 86 biases the cylindrical portion 87 in the positive third direction Z. Consequently, the cylindrical portion 87 is pushed against the reference plate 88 by the push spring 86 and squeezed between the push spring 86 and the reference plate 88.

When the cylindrical portion 87 expands thermally, it is displaced in the negative third direction Z against the biasing force of the push spring 86 because the reference plate 88 is held stationary. Consequently, if thermal expansion occurs, the reference plate 88 to which the guide mechanism for the powder feeder mechanism 7 is held can be prevented from being displaced in the third direction Z.

Furthermore, by squeezing the cylindrical portion 87 between the reference plate 88 and the push spring 86, the cylindrical portion 87 of the manufacturing box 83 can be retained without using a securing mechanism or securing means such as a set screw. Consequently, the cylindrical portion 87 of the manufacturing box 83 can be easily mounted and detached.

In the above example, the push spring 86 is used as the push mechanism. The invention is not restricted to this example. For example, an air spring or air cylinder utilizing air pressure may also be used as the push mechanism.

Figure 12:
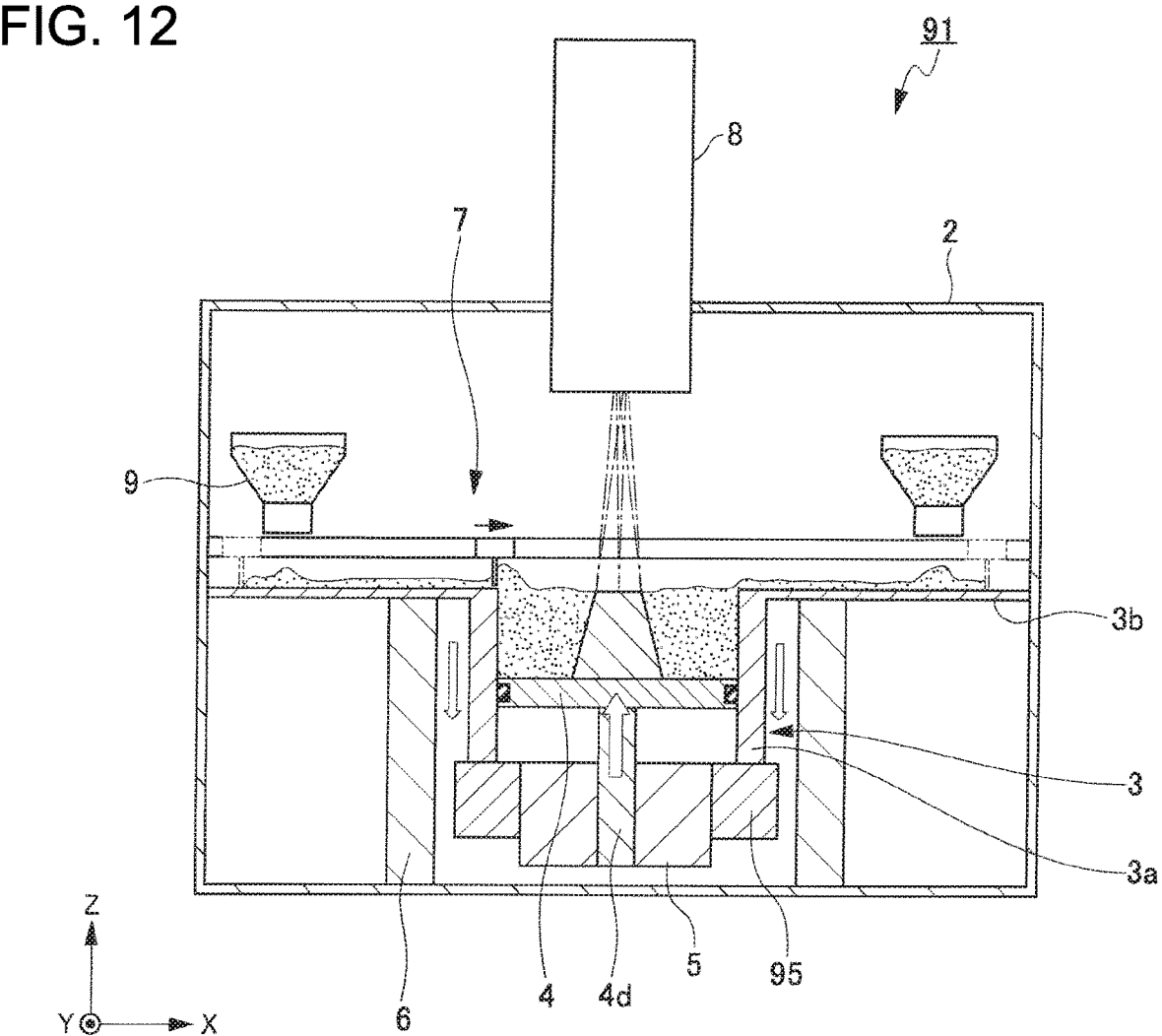
FIG. 12 is a schematic cross-sectional view of an additive manufacturing machine associated with a fifth embodiment of the invention.

The reference plate 88 of the manufacturing box 83 is not displaced in the third direction Z upon thermal expansion but the shaft portion 4d for moving the support stage 4 is elongated, due to thermal expansion, in the positive third direction Z as indicated by the upward white arrow in FIG. 12. Consequently, the position of the shaft portion 4d on the working surface 4a of the support stage 4 in the third direction Z is displaced due to thermal expansion. This gives rise to error in the amount of movement of the support stage 4. As a result, the conventional additive manufacturing machine has the problem that a powder layer of a desired thickness cannot be formed due to thermal expansion of the drive mechanism for moving the support stage.

However, the amount of elongation of the shaft portion 4d caused by thermal expansion can be calculated by temperature measurements while using the reference plate 88 as a reference because the position of the reference plate 88 in the third direction Z does not vary. The stage drive mechanism 5 can move the support stage 4 into position by correcting the amount of movement of the support stage 4 with the calculated amount of elongation of the shaft portion 4d. As a result, a powder layer can be formed to an appropriate thickness.

In other respects, the additive manufacturing machine 81 is similar in configuration with the additive manufacturing machine 1 associated with the first embodiment and so a description of such similarities is omitted. The additive manufacturing machine 81 having this configuration can yield advantageous effects similar to those provided by the additive manufacturing machine 1 associated with the first embodiment.

5. Fifth Embodiment

An additive manufacturing machine associated with a fifth embodiment is next described by referring to FIG. 12, which is a schematic cross-sectional view of this additive manufacturing machine.

The additive manufacturing machine associated with the fifth embodiment is generally indicated by reference numeral 91 and similar to the additive manufacturing machine 1 associated with the first embodiment except for the position at which the stage drive mechanism 5 is mounted. Therefore, only the installation position of the stage drive mechanism 5 is described here; those parts of the additive manufacturing machine 91 which are common to their counterparts of the additive manufacturing machine 1 associated with the first embodiment are indicated by the same reference numerals as in the foregoing figures and a repetition of the description thereof is omitted.

As shown in FIG. 12, the stage drive mechanism 5 is mounted via a mounting member 95 to the rear end of the cylindrical portion 3a of the manufacturing box 3 as viewed in the third direction Z. When the shaft portion 4d of the support stage 4 is elongated in the positive third direction Z due to thermal expansion, the cylindrical portion 3a of the manufacturing box 3 is elongated in the negative third direction Z due to thermal expansion as indicated by the downward white arrows. In consequence, the elongation of the shaft portion 4d and the elongation of the cylindrical portion 3a cancel each other. This can suppress displacements of the position of the working surface 4a of the support stage 4 upon thermal expansion. Hence, the support stage 4 can be moved into position.

In other respects, the additive manufacturing machine 91 is similar in configuration with the additive manufacturing machine 1 associated with the first embodiment and so a description of such similarities is omitted. The additive manufacturing machine 91 of this configuration can yield advantageous effects similar to those provided by the additive manufacturing machine 1 associated with the first embodiment.

6. Sixth Embodiment

Figure 13:
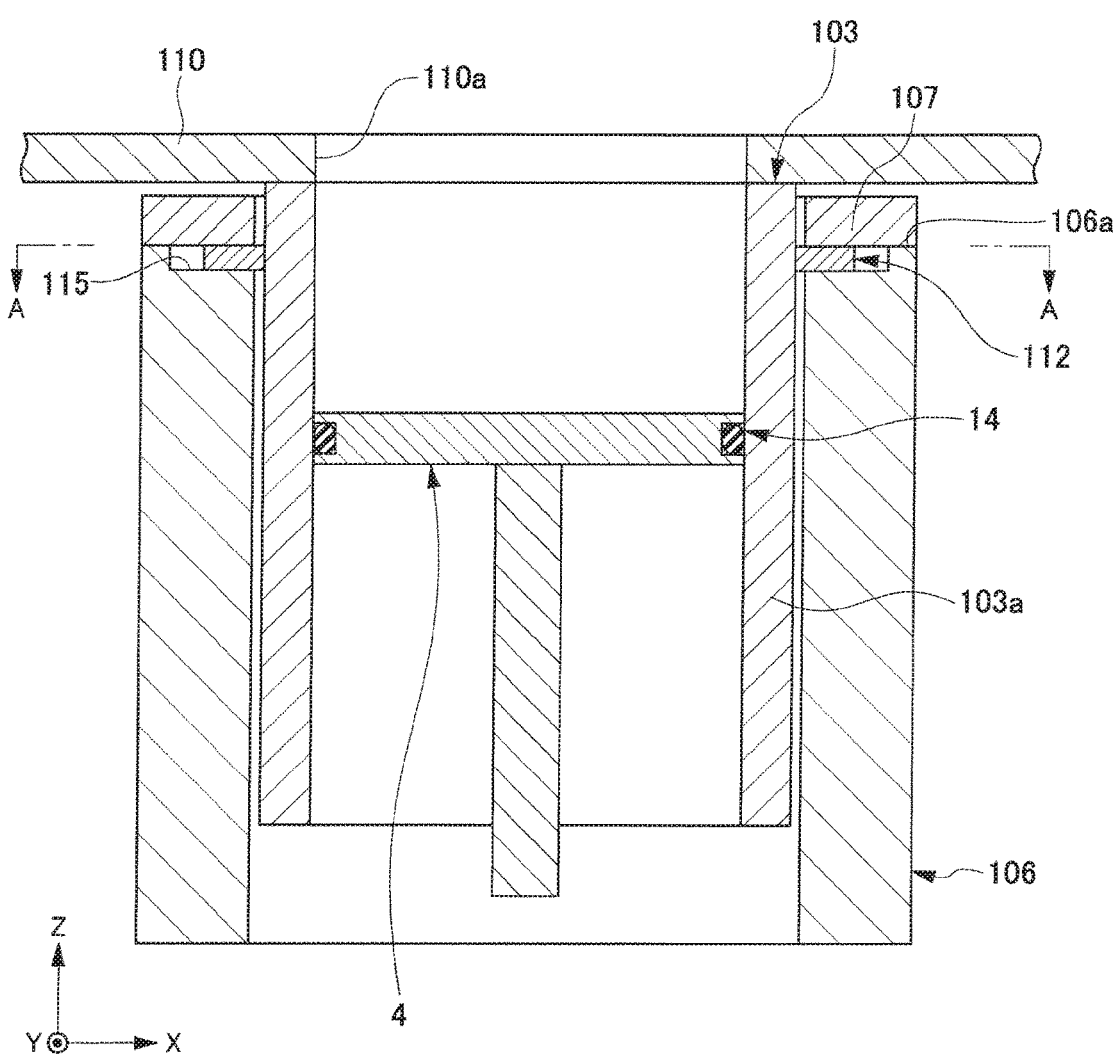
FIG. 13 is a cross-sectional view of a manufacturing box of an additive manufacturing machine associated with a sixth embodiment of the invention.
Figure 14:
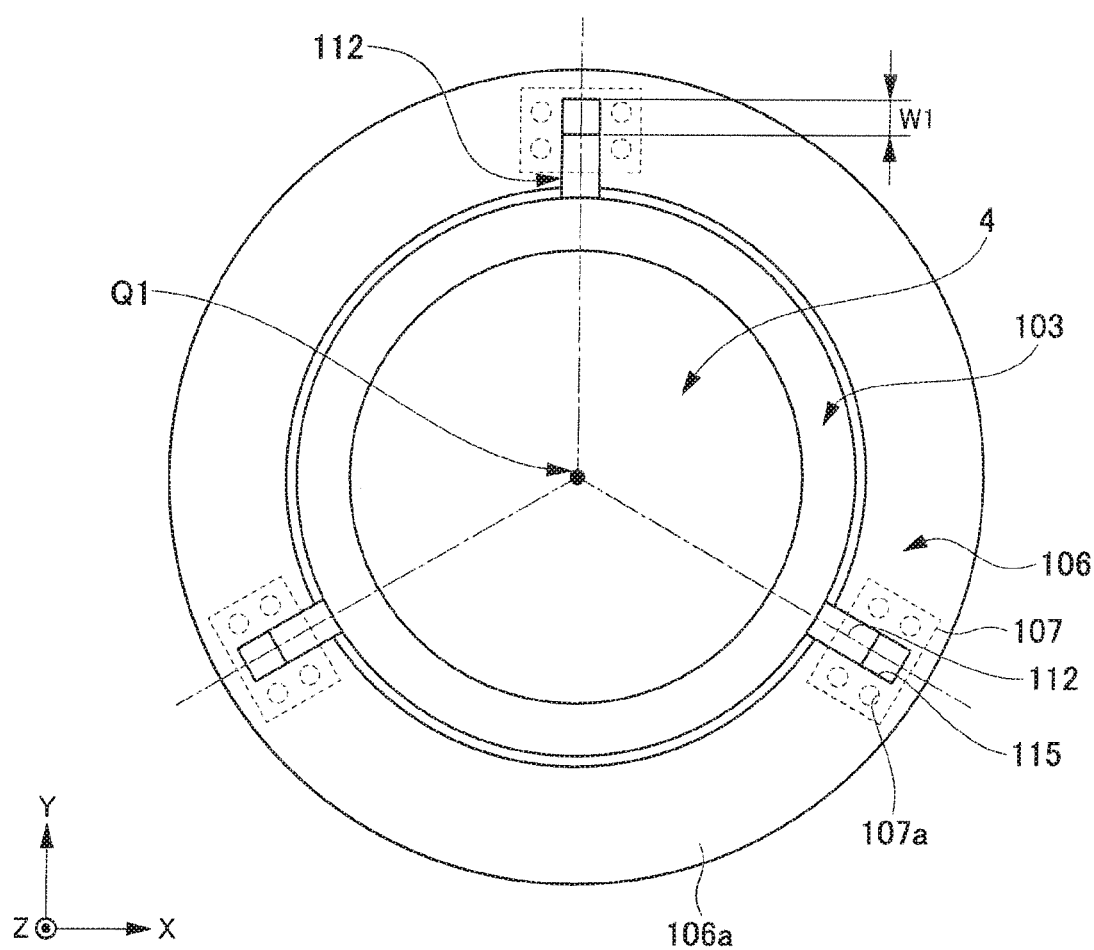
FIG. 14 is a plan view of the manufacturing box shown in FIG. 13.

An additive manufacturing machine associated with a sixth embodiment is next described by referring to FIGS. 13 and 14, which show the manufacturing box of this additive manufacturing machine. FIG. 14 is a plan view of the manufacturing box, as viewed on lines A-A of FIG. 13.

The additive manufacturing machine associated with the sixth embodiment is similar to the additive manufacturing machine 1 associated with the first embodiment except for the configurations of manufacturing box and support base. Therefore, only the manufacturing box and support base are described here; those portions which are common to their counterparts of the additive manufacturing machine 1 associated with the first embodiment are indicated by the same reference numerals as in the foregoing figures and a repetition of the description thereof is omitted.

As shown in FIGS. 13 and 14, the manufacturing box, 103, is shaped cylindrically and has a cylindrical portion 103a. Three support pins 112 are mounted on the outer peripheral surface of the cylindrical portion 103a. The support pins 112 protrude substantially perpendicularly from the outer peripheral surface of the cylindrical portion 103a and project radially outwardly. The three support pins 112 are arranged equiangularly peripherally of the cylindrical portion 103a. The support pins 112 protrude radially about the center Q1 of the manufacturing box 103 and are placed in support grooves 115 formed in a support base 106 (described later).

Note that the number of the support pins 112 is not restricted to three. The number may be four or more. If four or more support pins 112 are provided, the support pins 112 are preferably arranged at regular angular intervals about the center Q1 of the cylindrical portion 103a, i.e., arranged rotationally symmetrically.

Also note that the shape of the cylindrical portion 103a of the manufacturing box 103 is not restricted to a cylindrical form. For example, the cylindrical portion 103a may be shaped into a cylinder of a square or hexagonal cross section, or a cylinder of any other cross-sectional shape in the same way as for the manufacturing box 63 associated with the third embodiment.

The three support grooves 115 are formed in a support surface 106a of the support base 106 that is at the front end in the third direction Z. The support grooves 115 are recessed in the negative third direction Z from the support surface 106a, i.e., recessed downwardly. Each of the support grooves 115 extends a given length from the inner wall surface of the support base 106 radially outwardly. The support grooves 115 extend radially about the center Q1 of the support base 106 and of the manufacturing box 103 which is supported to the support base 106. The support pins 112 are arranged in the support grooves 115, respectively.

The width (lateral dimension) and depth (depthwise dimension taken in the third direction Z) of each support groove 115 are set substantially equal to the outside diameter of each support pin 112. Therefore, when the support pins 112 are placed in the support grooves 115, peripheral movement of the manufacturing box 103 can be restricted by the support pins 112 and the support grooves 115.

As shown in FIG. 14, a gap W1 is formed between the end of each support pin 112 on the opposite side of the cylindrical portion 103a, i.e., the front end, and the end of a respective one of the support grooves 115 on the opposite side of the inner wall surface of the support base 106. The length of the gap W1 is so set that if the manufacturing box 103 and the support pins 112 expand thermally, the box 103 and the support base 106 will not mechanically interfere with each other.

When the manufacturing box 103 and the support pins 112 expand thermally in the first direction X and in the second direction Y, the gaps W1 formed between the support pins 112 and the support grooves 115 permit the support pins 112 to slide in their respective support grooves 115. The three support pins 112 and the three support grooves 115 are arranged radially about the center Q1 of the manufacturing box 103 and rotationally symmetrically. Therefore, the three support pins 112 thermally expand radially outwardly uniformly about the center Q1 of the manufacturing box 3. This can prevent the position of the center Q1 of the manufacturing box 103 from varying upon thermal expansion of the box 103, thus enhancing the accuracy of the manufacturing.

Pin retainers 107 are removably mounted on the support surface 106a of the support base 106 and placed at positions on the support surface 106a where the support grooves 115 are formed. The pin retainers 107 are mounted on the support base 106 by means of securing bolts 107a. Furthermore, the pin retainers 107 restrict the support pins 112 disposed in the support grooves 115 from moving in the positive third direction Z, i.e., upwardly.

A plate 110 is disposed on the upper end of the manufacturing box 103 and over the upper end of the support base 106, as viewed in the positive third direction Z. The plate 110 is secured to the front end of the cylindrical portion 103*a* of the manufacturing box 103 in the positive third direction Z, i.e., the upper end, for example, by means of set screws. The plate 110 is not in contact with the support base 106. This can suppress transmission of heat of the plate 110 to the support base 106. A heat shield may be placed between the plate 110 and the support base 106 to prevent radiation of heat from the plate 110 to the support base 106.

The plate 110 is provided with a substantially circular opening 110*a* which is nearly equal in size to the cylindrical interior hole in the cylindrical portion 103*a* of the manufacturing box 103. The opening 110*a* in the plate 110 faces both the interior hole of the cylindrical portion 103*a* and the support stage 4. Powdered material M1 fed from the powder reservoir 9 (see FIG. 1) is placed on the upper surface of the plate 110 as viewed in the positive third direction Z. The plate 110 covers the pin retainers 107. The plate 110 plays the same role as the flange portion 3*b* of the manufacturing box 3 associated with the first embodiment or as the reference plate 88 associated with the fourth embodiment.

In other respects, the additive manufacturing machine associated with the sixth embodiment is similar in configuration with the additive manufacturing machine 1 associated with the first embodiment and so a description of such similarities is omitted. The additive manufacturing machine constructed in this way yields advantageous effects similar to those produced by the additive manufacturing machine 1 associated with the first embodiment.

When the completed 3D object K1 is taken out, the support stage 4 is moved in the positive third direction Z, i.e., elevated upwardly in the up/down direction. During the process of manufacturing the 3D object, when the powdered material M1 is spread again, the support stage 4 is sometimes elevated by an amount equal to one or a given number of layers. When the support stage 4 is elevated in this way, there is the possibility that the manufacturing box floats up together with the support stage 4 because of friction of the manufacturing box against the built object K1, powdered material M1, and slidable member 14.

In contrast, in the additive manufacturing machine associated with the sixth embodiment, as described above, the pin retainers 107 suppress the support pins 112 mounted to the manufacturing box 103 from moving in the third direction Z. Consequently, when the support stage 4 is moved upward, the friction of the manufacturing box 103 against the built 3D object K1, powdered material M1, and slidable member 14 can prevent the manufacturing box 103 from floating up together with the support stage 4. As a result, when the powdered material M1 is spread again, the manufacturing box 103 can be prevented from varying in position in the third direction Z. Thus, the powdered material M1 can be spread again accurately.

7. Seventh Embodiment

Figure 15:
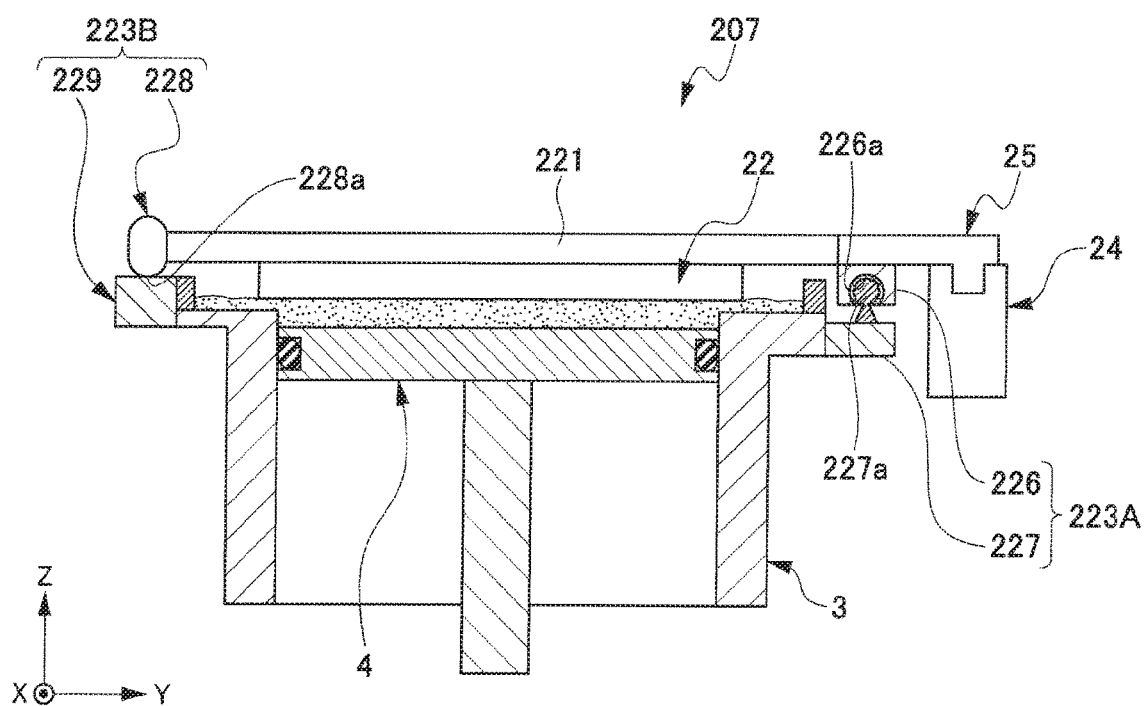
FIG. 15 is a schematic cross-sectional view of an additive manufacturing machine associated with a seventh embodiment of the invention.

An additive manufacturing machine associated with a seventh embodiment is next described by referring to FIG. 15, which schematically shows the configuration of this additive manufacturing machine.

The additive manufacturing machine associated with the seventh embodiment is similar to the additive manufacturing machine 1 associated with the first embodiment except for the configuration of the powder feeder mechanism. Therefore, only the powder feeder mechanism is described here. Those components of the additive manufacturing machine associated with the seventh embodiment which are common with their counterparts of the additive manufacturing machine 1 associated with the first embodiment are indicated by the same reference numerals as in the foregoing figures and a repetition of the description thereof is omitted.

As shown in FIG. 15, the powder feeder mechanism, 207, has an arm portion 221, a smoothing plate 22, a first guiding mechanism 223A, a second guiding mechanism 223B, a drive mechanism 24, and a connective portion 25. The smoothing plate 22, drive mechanism 24, and connective portion 25 are identical in configuration with their respective counterparts 22, 24, and 25 associated with the first embodiment and so a description thereof is omitted.

The first guiding mechanism 223A is disposed at the front end of the manufacturing box 3 in the second direction Y. The first guiding mechanism 223A has a slider 226 and a guide rail 227. The guide rail 227 is disposed at the front end of the manufacturing box 3 in the second direction Y and runs parallel to the first direction X.

The guide rail 227 has a substantially cylindrical guide portion 227*a* which is disposed at the front end of the guide rail 227 in the third direction Z, i.e., at a higher position in the up/down direction. The slider 226 is supported to the guide portion 227*a* so as to be slidable in the first direction X.

The slider 226 is disposed at the longitudinal front end of the arm portion 221, i.e., at the front end in the second direction Y. The slider 226 has a sliding surface 226*a* which is recessed circularly according to the curvature of the outer peripheral surface of the guide portion 227*a*. The sliding surface 226*a* slides on the outer peripheral surface of the guide portion 227*a*. Therefore, the slider 226 is supported to the guide rail 227 such that it can not only move in the first direction X but also rotate about the central axis of the guide portion 227*a*.

The second guiding mechanism 223B is disposed at the rear end of the manufacturing box 3 in the second direction Y. The second guiding mechanism 223B has a guide roller 228 and a guide surface portion 229. The guide surface portion 229 is shaped substantially in the form of a flat plate and placed at the rear end of the manufacturing box 3 in the second direction Y. The guide surface portion 229 extends parallel to the first direction X.

The guide roller 228 is rotatably disposed at the longitudinal rear end of the arm portion 221, i.e., rear end in the second direction Y. The guide roller 228 is rotatably in contact with the front surface of the guide surface portion 229 in the third direction Z, i.e., its upper surface. The contact surface 228*a* of the guide roller 228 in contact with the guide surface 229 is curved relative to the second direction Y and the third direction Z.

In other respects, the additive manufacturing machine associated with the seventh embodiment is similar in configuration to the additive manufacturing machine 1 associated with the first embodiment and so a description of such similarities is omitted. The additive manufacturing machine constructed in this way can yield advantageous effects similar to those produced by the additive manufacturing machine 1 associated with the first embodiment.

There is a possibility that the positions of the first guiding mechanism 223A and of the second guiding mechanism 223B in the third direction Z may vary due to temperature nonuniformity within the manufacturing box 3, temperature gradient across the powder feeder mechanism 207, difference in thermal conduction between the first guiding mechanism 223A and the second guiding mechanism 223B, and other factors. In contrast, in the powder feeder mechanism 207 associated with the seventh embodiment, the slider 226 is supported so as to be rotatable about the central axis of the guide portion 227a of the guide rail 227.

Therefore, if the first guiding mechanism 223A and the second guiding mechanism 223B differ in position taken in the third direction Z, the slider 226 rotates about the guide portion 227a. Consequently, if a positional deviation in the third direction Z occurs between the first guiding mechanism 223A and the second guiding mechanism 223B, the slider 226 smoothly slides on the guide portion 227a without rattling.

Concomitantly with the positional deviation in the third direction Z between the first guiding mechanism 223A and the second guiding mechanism 223B, the arm portion 221 tilts relative to the second direction Y. However, the contact surface 228a of the guide roller 228 is curved. Therefore, if the arm portion 221 tilts, the contact surface 228a of the guide roller 228 can be reliably brought into contact with the guide surface portion 229.

In this way, according to the powder feeder mechanism 207 associated with the seventh embodiment, if various components undergo asymmetrical thermal expansions, occurrence of excessive frictional resistances and mechanical loads can be suppressed during operation of the powder feeder mechanism 207. As a result, the arm portion 221 and the smoothing plate 22 can be smoothly moved. In addition, mechanical interference between the smoothing plate 22 and the manufacturing box 3 can be prevented. The powdered material M1 can be smoothed out.

8. Eighth Embodiment

Figure 16:
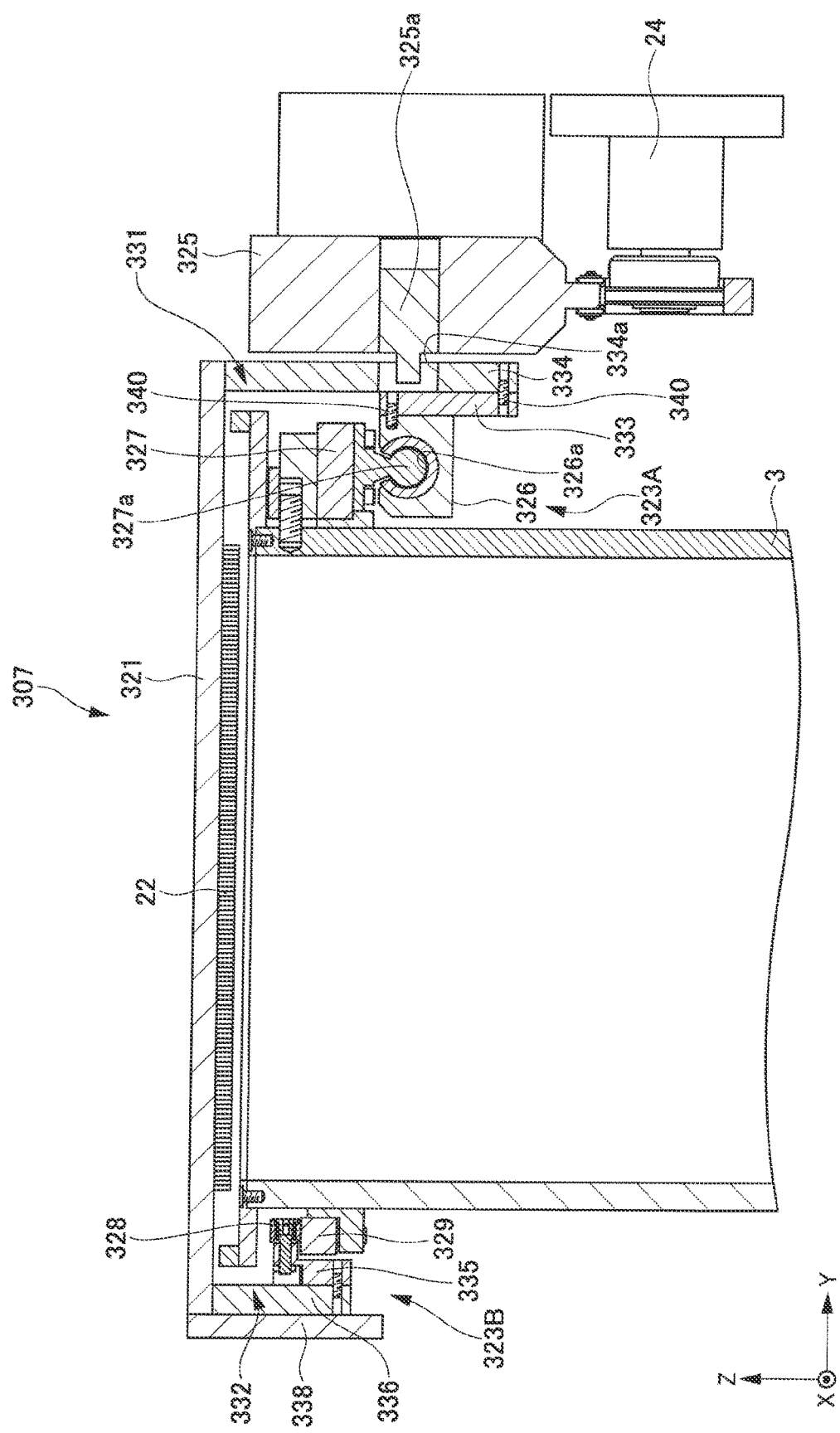
FIG. 16 is a schematic cross-sectional view of an additive manufacturing machine associated with an eighth embodiment of the invention.
Figure 17:
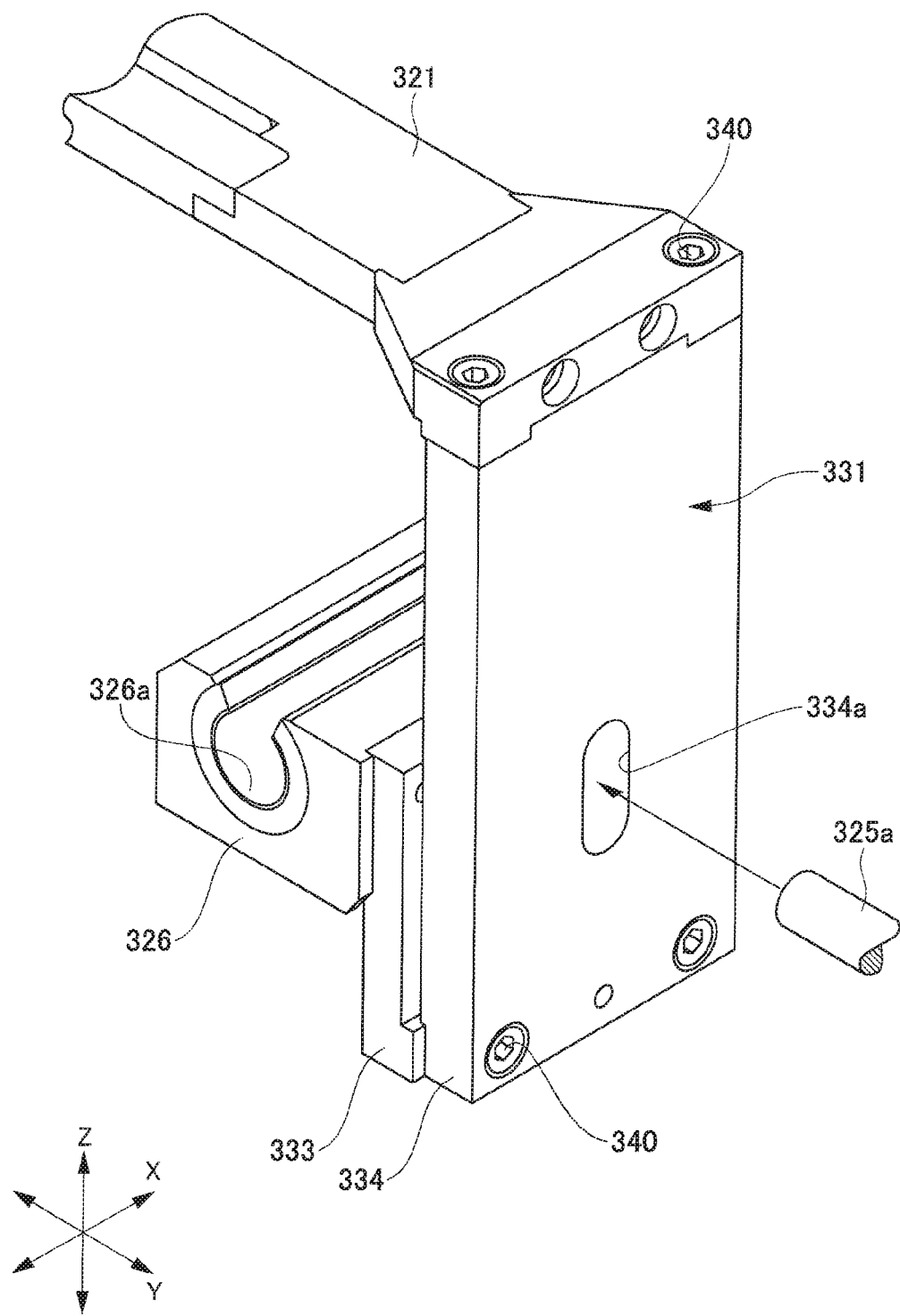
FIG. 17 is an enlarged perspective view of the connective portion and arm portion of the additive manufacturing machine shown in FIG. 16, illustrating the manner in which the connective portion and the arm portion are connected together.
Figure 18:
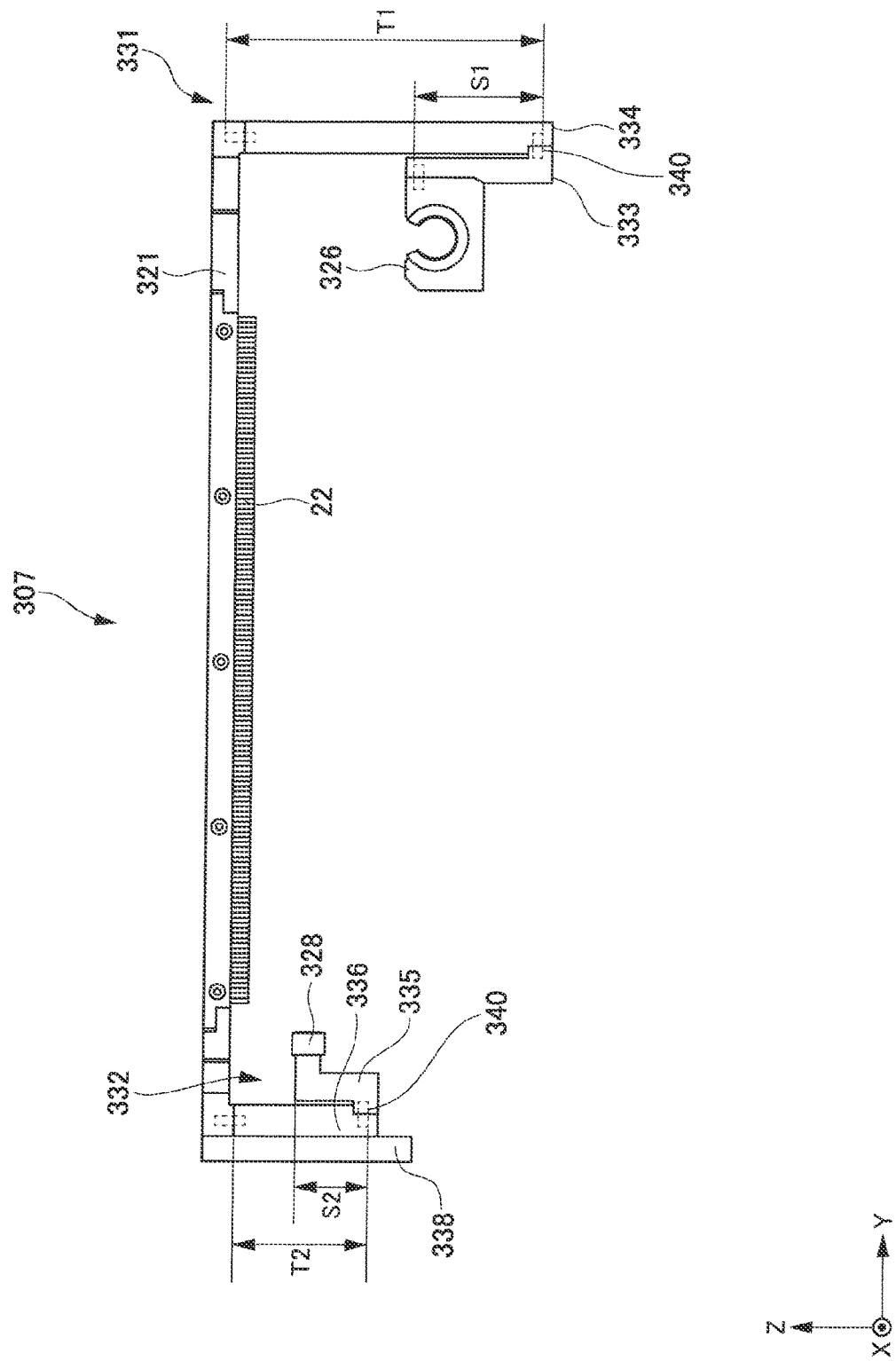
FIG. 18 is a front elevation of the arm portion shown in FIG. 17.

An additive manufacturing machine associated with an eighth embodiment is next described by referring to FIGS. 16-18. FIG. 16 schematically shows the configuration of this additive manufacturing machine. FIG. 17 is an enlarged perspective view illustrating the manner in which the connector portion and the arm portion are connected together. FIG. 18 is a front elevation of the arm portion.

The additive manufacturing machine associated with the eighth embodiment is similar to the additive manufacturing machine 1 associated with the first embodiment except for the configuration of the powder feeder mechanism. Therefore, only the powder feeder mechanism is described here. Those components of the additive manufacturing machine associated with the eighth embodiment which are common with their counterparts of the additive manufacturing machine 1 associated with the first embodiment are indicated by the same reference numerals as in the foregoing figures and a repetition of the description thereof is omitted.

As shown in FIG. 16, the powder feeder mechanism, 307, has an arm portion 321, a smoothing plate 22, a first guiding mechanism 323A, a second guiding mechanism 323B, a drive mechanism 24, and a connector portion 325. The smoothing plate 22 and drive mechanism 24 are similar in configuration with the smoothing plate 22 and drive mechanism 24, respectively, associated with the first embodiment and so a description thereof is omitted.

The arm portion 321 has a first arm supporting portion 331 and a second arm supporting portion 332. The first arm supporting portion 331 is located at the longitudinal front end of the arm portion 321, i.e., at the front end in the second direction Y.

The first arm supporting portion 331 has a first member 333 and a second member 334. Each of the first and second members 333, 334 is shaped generally in the form of a flat plate. The first member 333 and the second member 334 are secured with set screws 340. In particular, the first member 333 and the second member 334 are fastened together at their rear ends in the third direction Z, i.e., at their lower ends in the up/down direction. The front end of the second member 334 in the third direction Z which is on the opposite side of its end secured to the first member 333, i.e., upper end in the up/down direction, is secured to the longitudinal front end of the arm portion 321 with other set screws 340.

A slider 326 constituting a part of the first guiding mechanism 323A is secured to the front end of the first member 333 in the third direction Z, the front end facing away from the end of the first member 333 secured to the second member 334. The slider 326 has a circularly recessed sliding surface 326a in the same way as the slider 226 associated with the seventh embodiment. The sliding surface 326a of the slider 326 associated with the eighth embodiment faces in the positive third direction Z, i.e., upward in the up/down direction. The slider 326 is slidably supported to the guide rail 327 that also constitutes a part of the first guiding mechanism 323A.

The guide rail 327 is positioned on the front end of the manufacturing box 3 in the second direction Y. The guide rail 327 has a generally cylindrical guide portion 327a in the same way as the guide rail 227 associated with the seventh embodiment. The guide portion 327a associated with the eighth embodiment is disposed at the rear end of the guide rail 327 in the third direction Z, i.e., beneath the guide rail 327 as viewed in the up/down direction, and faces downward in the up/down direction. Consequently, the guide rail 327 associated with the eighth embodiment can prevent the powdered material M1 and so on from adhering to the guide portion 327a. This enables smooth sliding motion of the slider 326 along the guide portion 327a.

As shown in FIGS. 16 and 17, the second member 334 is provided with a connection hole 334a in which a connecting pin 325a mounted on the connector portion 325 is inserted. The connecting pin 325a protrudes in the negative second direction Y from the connector portion 325.

The connection hole 334a formed in the second member 334 is a slot elongated in the third direction Z. The length of the opening of the connection hole 334a in the first direction X is set nearly equal to the outside diameter of the connecting pin 325a. Therefore, when the connecting pin 325a is inserted into the connection hole 334a, the pin 325a abuts against the side surface of the connection hole 334a lying in the first direction X. Consequently, the connector portion 325 can transmit force to the arm portion 321 via the connection pin 325a in the first direction X.

Since the connection hole 334a is a slot elongated in the third direction Z, the force in the connection portion 325 in the third direction Z is not transmitted to the second member 334, i.e., the arm portion 321. A gap is present between the connector portion 325 and the second member 334 and extends in the second direction Y. Therefore, the force on the connector portion 325 acting in the second direction Y is not transmitted to the second member 334, i.e., the arm portion 321.

Consequently, forces can be transmitted from the connector portion 325 to the arm portion 321 only in the first direction X. This can prevent transmission of vibrations of the drive mechanism 24 in the second direction Y and third direction Z to the arm portion 321.

In the eighth embodiment, an example is given in which the connecting pin 325a is mounted to the connector portion 325 and the connection hole 334a is formed in the second member 334 that is the arm portion 321. The present invention is not restricted to this. For example, the connection hole may be formed in the connector portion 325, and the connecting pin may be mounted to the second member 334.

Furthermore, the connection mechanism composed of the connecting pin 325a and the connection hole 334a may be applied to additive manufacturing machines associated with the first to seventh embodiments.

The second arm supporting portion 332 is disposed at the longitudinal rear end of the arm portion 321, i.e., at the rear end in the second direction Y. The second arm supporting portion 332 has a first member 335 and a second member 336 in the same way as the first arm supporting portion 331.

Each of the first member 335 and the second member 336 is shaped substantially in the form of a flat plate. The first member 335 and the second member 336 are fastened together with set screws 340. In particular, the first member 335 and the second member 336 are secured together at their rear ends in the third direction Z, i.e., at their lower ends as viewed in the up/down direction. The front end of the second member 336 in the third direction Z that is on the opposite side of the position where the second member 336 is secured to the first member 335, i.e., the upper end in the up/down direction, is secured to the longitudinal rear end of the arm portion 321 with set screws 340.

A guide roller 328 that constitutes the second guiding mechanism 323B together with a guide surface portion 329 is mounted at the front end of the first member 335 in the third direction Z which is on the opposite side of the position where the first member 335 is secured to the second member 336. Since the configurations of the guide roller 328 and guide surface portion 329 are similar to the configurations of the guide roller 228 and guide surface portion 229 associated with the seventh embodiment, a description thereof is omitted.

A weight 338 is securely fixed to the second member 336 of the second arm supporting portion 332 and mounted at the rear end of the second member 336 in the second direction Y to assure that the guide roller 328 is brought into contact with the guide surface portion 329. Consequently, the arm portion 321 can be smoothly moved without rattling. The configuration of mounting of the weight 338 to the arm portion 321 may also be applied to the additive manufacturing machines associated with the first through seventh embodiments.

The configurations of the first arm supporting portion 331 and the second arm supporting portion 332 are described in further detail by referring to FIG. 18. The length S1 taken from the location of the first arm supporting portion 331 where it is secured to the slider 326 of the first member 333 to the location where the first arm supporting portion 331 is secured to the second member 334 is set shorter than the length T1 taken from the location of the second member 334 where it is secured to the first member 333 to the location where it is secured to the arm portion 321. That is, the length S1 of the first member 333 in the third direction Z is shorter than the length T1 of the second member 334 in the third direction Z.

Similarly, the length S2 taken from the location where the second arm supporting portion 332 is secured to the guide roller 328 of the first member 335 to the location where the second arm supporting portion 332 is secured to the second member 336 is set shorter than the length T2 taken from the location where the second member 336 is secured to the first member 335 to the location where the second member 336 is secured to the arm portion 321. That is, the length S2 of the first member 335 in the third direction Z is shorter than the length T2 of the second member 336 in the third direction Z.

The first member 333 and the second member 334 of the first arm supporting portion 331 are made of different materials. Similarly, the first member 335 and the second member 336 of the second arm supporting portion 332 are made of different materials. In particular, the first members 333 and 335 are made of materials having larger linear coefficients of expansion than those of the second members 334 and 336. The ratios of the lengths S1:T1 and S2:T2 of the first members 333, 335 and the second members 334, 336 in the third direction Z are set approximately equal to the inverse ratios of the linear coefficients of expansion of the first members 333, 335 and the second members 334, 336.

Thus, if the first arm supporting portion 331, for example, expands thermally due to temperature rise, the first member 333 expands in the positive third direction Z, i.e., upward in the up/down direction, from the location where the first member 333 is secured to the second member 334. In contrast, the second member 334 expands in the negative third direction Z, i.e., downward in the up/down direction, from the location where the second member 334 is secured to the arm portion 321. As described previously, the first member 333 is made of a material having a linear coefficient of expansion greater than that of the second member 334. Consequently, the coefficient of thermal expansion of the first member 333 in the third direction Z is greater than that of the second member 334.

As described above, the length S1 of the first member 333 in the third direction Z is shorter than the length T1 of the second member 334 in the third direction Z. The ratio of the lengths S1:T1 is set equal to the inverse ratio of the linear coefficients of expansion of the first member 333 and the second member 334. In consequence, the length of thermal expansion of the first member 333 in the positive third direction Z and the length of thermal expansion of the second member 334 in the negative third direction Z are almost equal to each other. Accordingly, the elongation of the first member 333 in the third direction Z due to thermal expansion can be canceled by the elongation of the second member 334 in the third direction Z due to thermal expansion.

This can suppress variations in the heights of the slider 326 and arm portion 321 of the first guiding mechanism 323A taken in the third direction Z. As a result, the slider 326 can be slid smoothly. Also, mechanical interference of the arm portion 321 with the manufacturing box 3 can be prevented. Further, variations in the thickness of powder layers due to thermal expansion of the powder feeder mechanism 307 can be prevented.

Since the second arm supporting portion 332 operates similarly to the first arm supporting portion 331, a description thereof is omitted.

In the above example of the eighth embodiment, the first members 333, 335 and the second members 334, 336 are made of materials such that the linear coefficients of expansion of the materials of the first members 333, 335 are greater than those of the materials of the second members 334, 336. The present invention is not restricted to this. For example, where the lengths of the first members 333, 335 in the third direction Z are greater than the lengths of the second members 334, 336 in the third direction Z, the first members 333, 335 are made of materials having linear coefficients of expansion smaller than those of the materials of the second members 334, 336.

The configuration of an arm support assembly consisting of the first arm supporting portion 331 and the second arm supporting portion 332 made of two materials having different linear coefficients of expansion according to their lengths in the third direction Z can also be applied to the additive manufacturing machines associated with the first through seventh embodiments.

In other respects, the additive manufacturing machine associated with the eighth embodiment is similar in configuration to the additive manufacturing machine 1 associated with the first embodiment and so a description thereof is omitted. The additive manufacturing machine constructed in this way can yield advantageous effects similar to those produced by the additive manufacturing machine 1 associated with the first embodiment.

It is to be understood that the present invention is not restricted to the embodiments which are described above and shown in the drawings but can be changed or modified in many different ways within the scope of the invention defined in the attached claims.

For example, in the above embodiments, powder of metals such as titanium, aluminum, iron, or the like is used as a powdered material. The present invention is not restricted to this example. For example, resins can be used as powdered materials. Furthermore, in the above examples, an electron gun for emitting an electron beam is set forth as a heating mechanism for preheating and melting a powdered material. The present invention is not restricted to this example. For example, a laser light source producing laser light may also be used as the heating mechanism.

In the present specification, the terms "parallel" and "perpendicular" are used. What is meant by the term "parallel," as used herein, is that there is a substantially parallel relationship in which the intended function can be accomplished. Similarly, what is meant by the term "perpendicular," as used herein, is that there is a substantially perpendicular relationship in which the intended function can be accomplished.

What is claimed is:

1. An additive manufacturing machine comprising:
   a support stage on which a powdered material for manufacturing a three-dimensional object is stacked as layers;
   a manufacturing box having a cylindrical portion on which the support stage is slidably disposed;
   a powder feeder mechanism for feeding the powdered material onto the support stage and smoothing out the powdered material; and
   a hollow processing chamber, wherein the support stage, the manufacturing box, and powder feeder mechanism are arranged inside the processing chamber;
   wherein the powder feeder mechanism comprises:
      an arm portion to which a smoothing plate for smoothing out the powdered material is fixedly secured;
      a guide mechanism secured to the manufacturing box and supporting the arm portion such that the arm portion can move in a first direction that is parallel to one surface of the support stage which defines a working surface;
      a connective portion connected to the arm portion and is configured to transmit a mechanical force to the arm portion only in the first direction;
      a drive mechanism secured to an inner wall surface of the processing chamber and having a drive portion for moving the connective portion in the first direction, and
   wherein, when a direction perpendicular to the one surface of the support stage is set as another direction so that mechanical force in the connective portion in the another direction is not transmitted to the arm portion, the arm portion is connected to the connective portion in a state that the arm portion can be displaced in the another direction.

2. An additive manufacturing machine as set forth in claim 1, wherein said connective portion is provided with a connective recessed portion into which said arm portion is inserted, and wherein the connective recessed portion is open in a direction perpendicular to said working surface of the support stage.

3. An additive manufacturing machine as set forth in claim 2, wherein an abutting pin made of a shock-absorbing material and making contact with said arm portion is installed in said connective recessed portion.

4. An additive manufacturing machine as set forth in claim 3, wherein said abutting pin is shaped semispherically and makes a point contact with said arm portion.

5. An additive manufacturing machine as set forth in claim 1, wherein a connecting pin protruding in a second direction perpendicular to said first direction is mounted to one of said connector portion and said arm portion, and wherein the other of said connector portion and said arm portion is provided with a connection hole into which the connecting pin is inserted, the connection hole being a slot elongated in a third direction perpendicular to both the first direction and the second direction.

6. An additive manufacturing machine as set forth in claim 1, wherein said guide mechanism has:
   a first guiding mechanism providing support of a front end of said arm portion which is parallel to said working surface of said support stage and which lies in a second direction perpendicular to said first direction; and
   a second guiding mechanism providing support of a rear end of the arm portion in the second direction.

7. An additive manufacturing machine as set forth in claim 6, wherein said second guiding mechanism supports said rear end of said arm portion in said second direction.

8. An additive manufacturing machine as set forth in claim 6,
   wherein said first guiding mechanism has a slider mounted to said arm portion and a guide rail extending in said first direction;
      wherein the guide rail has a cylindrical guide portion for supporting the slider such that the slider can slide in the first direction; and
      wherein the slider has a sliding surface which is recessed circularly according to the curvature of the outer peripheral surface of the guide portion and which slides on the outer peripheral surface of the guide portion, the slider being supported so as to be rotatable about a central axis of the guide portion.

9. An additive manufacturing machine as set forth in claim 8, wherein said guide portion is mounted beneath said guide rail in an up/down direction.

10. An additive manufacturing machine as set forth in claim 8, wherein said second guiding mechanism has a guide roller mounted to said arm portion and a guide surface portion which extends in said first direction and on which the guide roller slides, and wherein the guide roller has a curved contact surface making contact with the guide surface portion.

11. An additive manufacturing machine as set forth in claim 8,
wherein there is further provided an arm support portion mounted at a front end of said arm portion in said second direction;
wherein the arm support portion has a first member secured to said slider of said first guiding mechanism and a second member secured both to the first member and to the front end of the arm portion in the second direction; and
wherein the first member and the second member are made of materials having different linear coefficients of expansion.

12. An additive manufacturing machine as set forth in claim 11, wherein the ratio of the length taken from the securing point of said first member where it is secured to said slider to the securing point where the first member is secured to the second member to the length taken from the securing point where the second member is secured to the arm portion to the securing point where the second member is secured to the first member is set according to the linear coefficients of expansion of the first and second members.

13. An additive manufacturing machine as set forth in claim 12, wherein the ratio of the length taken from the securing point of said first member where it is secured to said slider to the securing point where the first member is secured to said second member to the length taken from the securing point where the second member is secured to said arm portion to the securing point where the second member is secured to the first member is the inverse ratio of the linear coefficients of expansion of the first and second members.

14. An additive manufacturing machine as set forth in claim 1, wherein said manufacturing box is supported by a support base, and wherein said cylindrical portion has an axial front end and an axial rear end which are a fixed end and a free end, respectively.

15. An additive manufacturing machine as set forth in claim 14, wherein said manufacturing box has a reference plate which is mounted at said axial front end of said cylindrical portion in a parallel relation to said working surface of the support stage and which is supported by said support base.

16. An additive manufacturing machine as set forth in claim 15, wherein said axial front end of said cylindrical portion is in abutment with said reference plate, and wherein there is further provided a push mechanism for pushing the cylindrical portion against the reference plate.

17. An additive manufacturing machine as set forth in claim 14, further comprising a stage drive mechanism for moving said support stage in a direction perpendicular to said working surface of the support stage, and wherein the stage drive mechanism is mounted to said axial rear end of the cylindrical portion of said manufacturing box.

18. An additive manufacturing machine as set forth in claim 14, further comprising support mechanisms mounted to said manufacturing box and to said support base and providing support of the manufacturing box, and wherein the manufacturing box is configured to be slidable in a direction parallel to said working surface of said support stage.

19. An additive manufacturing machine as set forth in claim 18, wherein said support mechanisms are plural in number and arranged at regular intervals around said cylindrical portion.

20. An additive manufacturing machine as set forth in claim 19, wherein said plural support mechanisms are arranged radially about the center of said cylindrical portion and slidably support said manufacturing box.

21. An additive manufacturing machine as set forth in claim 18, wherein said support mechanisms comprise:
support pins mounted on the outer peripheral surface of said cylindrical portion and protruding outwardly from the outer peripheral surface;
support grooves formed in an upper end portion of said support base as viewed in an up/down direction and having the support pins arranged therein; and
pin retainers for holding down the support pins from above in the up/down direction, the support pins being arranged in the support grooves.

22. An additive manufacturing machine as set forth in claim 21, wherein each of said support pins has a first end portion on the opposite side of the outer peripheral surface of said cylindrical portion and each of said support grooves has a second end portion on the opposite side of the inner wall surface of said support base, and wherein gaps are formed between the first end portions of the support pins and their respective second end portions of the support grooves, respectively.

* * * * *